US012770191B2

(12) United States Patent
Acuña-Rohter et al.

(10) Patent No.: US 12,770,191 B2
(45) Date of Patent: Oct. 20, 2026

(54) TOKENS, AND THE USE THEREOF, FOR PUBLIC DISTRIBUTION OF MESSAGES HAVING A PRIVATE ASSOCIATION WITH A SUBSET OF THE MESSAGE RECIPIENTS

(71) Applicant: Chicago Mercantile Exchange Inc., Chicago, IL (US)

(72) Inventors: José Antonio Acuña-Rohter, Des Plaines, IL (US); Erik Helleren, Chicago, IL (US); Barry Galster, Chicago, IL (US); Paul Callaway, Evanston, IL (US); Pearce Peck-Walden, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 180 days.

(21) Appl. No.: 18/893,056

(22) Filed: Sep. 23, 2024

(65) Prior Publication Data

US 2025/0014104 A1 Jan. 9, 2025

Related U.S. Application Data

(63) Continuation of application No. 17/573,201, filed on Jan. 11, 2022, now Pat. No. 12,125,100, which is a (Continued)

(51) Int. Cl.
*G06Q 40/04* (2012.01)
*G06Q 10/107* (2023.01)

(52) U.S. Cl.
CPC ........... *G06Q 40/04* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 5,802,499 | A | 9/1998 | Sampson et al. |
| 6,850,907 | B2 | 2/2005 | Lutnick et al. |

(Continued)

FOREIGN PATENT DOCUMENTS

| | | | |
|---|---|---|---|
| EP | 1225717 | A2 | 7/2002 |
| EP | 2851862 | A1 | 3/2015 |

OTHER PUBLICATIONS

Leach, et al., A Universally Unique IDentifier (UUID) URN Namespace, Jul. 2005, retrieved from https://datatracker.ietf.org/doc/html/rfc4122 (Year: 2005).*

(Continued)

*Primary Examiner* — Gregory S Cunningham, II
(74) *Attorney, Agent, or Firm* — Lempia Summerfield Katz LLC

(57) ABSTRACT

The disclosed embodiments relate to creation and dissemination of unique identifiers, i.e. tokens, for use in communication of messages from a transaction processing system, to participants therein whereby messages, or at least a portion of the content thereof, indicative of a response to a request, to transact or modify a prior transaction, are consolidated, or otherwise combined, with the corresponding directed reporting messages communicated to the particular participants participating in the reported transaction while preserving the anonymity of those participants to which messages are particularly directed. The identifiers are structured so as to facilitate rapid validation and dissemination while eliminating the ability to associate any given identifier, or set thereof, with a participant.

27 Claims, 7 Drawing Sheets

Related U.S. Application Data continuation of application No. 14/705,353, filed on May 6, 2015, now Pat. No. 11,257,153.

(56) References Cited

U.S. PATENT DOCUMENTS

| | | | |
|---|---|---|---|
| 7,010,565 B2 | 3/2006 | Sampson | |
| 7,389,422 B2 | 6/2008 | Banerjee et al. | |
| 7,426,721 B1 | 9/2008 | Saulpaugh et al. | |
| 7,774,370 B2 | 8/2010 | Sampson | |
| 8,184,805 B2 | 5/2012 | Yokota et al. | |
| 8,447,967 B1 | 5/2013 | Janacek et al. | |
| 2002/0097878 A1 | 7/2002 | Ito et al. | |
| 2002/0128945 A1 | 9/2002 | Moss et al. | |
| 2002/0161994 A1 | 10/2002 | Cromer et al. | |
| 2002/0169706 A1 | 11/2002 | Chandra et al. | |
| 2005/0169219 A1 | 8/2005 | Serpa et al. | |
| 2007/0118455 A1 | 5/2007 | Albert et al. | |
| 2007/0118460 A1 | 5/2007 | Bauerschmidt et al. | |
| 2008/0005571 A1 | 1/2008 | Moskowitz | |
| 2008/0235336 A1 * | 9/2008 | Stern | H04L 63/0407 709/206 |
| 2010/0094745 A1 | 4/2010 | Peterffy | |
| 2011/0071958 A1 | 3/2011 | Grody et al. | |
| 2011/0119176 A1 | 5/2011 | Hanson et al. | |
| 2011/0302128 A1 | 12/2011 | Hayashi et al. | |
| 2012/0022994 A1 | 1/2012 | Conary et al. | |
| 2012/0221462 A1 | 8/2012 | De Verdier | |
| 2012/0239574 A1 | 9/2012 | Smith et al. | |
| 2012/0246055 A1 | 9/2012 | Schlifstein et al. | |
| 2012/0250865 A1 | 10/2012 | Terpstra et al. | |
| 2012/0254008 A1 | 10/2012 | Brady | |
| 2012/0310838 A1 | 12/2012 | Harris et al. | |
| 2013/0024493 A1 * | 1/2013 | Salonen | H04L 51/214 709/202 |
| 2013/0218739 A1 * | 8/2013 | Kmiec | G06Q 40/04 705/37 |
| 2013/0318626 A1 | 11/2013 | Heidenreich et al. | |
| 2014/0143121 A1 | 5/2014 | Stevens | |
| 2015/0073970 A1 | 3/2015 | Merold et al. | |
| 2015/0088723 A1 | 3/2015 | Acuna-rohter | |

OTHER PUBLICATIONS

EP Examination Report, from EP Application No. 16790153, Nov. 26, 2020, EP.

Extended European Search Report from EP 14869685.9, Apr. 3, 2017.

Extended European Search Report from EP Application No. 13749436.5, Sep. 18, 2015.

Extended Search Report, from EP Application No. 14186095.7, Jan. 29, 2015, EP.

Github, "Mongoid::Token—Short Snappy Tokens for Mongoid Documents", 5 pages, https://github.com/thetron/mongoid_token, 2015.

International Preliminary Report on Patentability in PCT/US2013/025665, dated Aug. 19, 2014, 9 pages.

International Search Report and Written Opinion from PCT/US13/25665 dated Mar. 14, 2013.

International Search Report and Written Opinion from, PCT/US16/31198, Aug. 16, 2016, WO.

International Search Report and Written Opinion in PCT/US14/68710, dated Mar. 12, 2015, 7 pages.

International Search Report and Written Opinion, from PCT/US2014/068749, Mar. 4, 2015, WO.

Supplementary European Search Report, from EP 16790153, Aug. 17, 2018, EP.

U.S. Appl. No. 13/399,364, filed Feb. 17, 2012.

Zhao et al., "Applications of Encode data to systematic analyses via data integration", Current Opinion in Systems Biology, vol. 11, pp. 57-64, 2018.

* cited by examiner

FIG. 5

| Root (12) | | Repeating Group (30) | | Description |
|---|---|---|---|---|
| Field (Tag) | Length | Field (Tag) | Length | |
| Msg Type | 0 | | | |
| Transact Time | 8 | | | |
| Match Event Indicator | 1 | | | |
| No MD Entries | 3 | | | |
| | | MD Update Action | 0 | |
| | | MD Entry Type | 1 | |
| | | Security ID | 4 | |
| | | Rpt Seq | 4 | |
| | | MD Entry Px | 8 | |
| | | MD Entry Size | 4 | |
| | | Number of Orders | 4 | |
| | | Trade ID | 4 | |
| | | Aggressor Side | 1 | |
| | | | | |

502 (Root rows: Msg Type to No MD Entries)

504 (Repeating Group rows)

Repeating group contains non consolidated trade messages
46 repeating groups per packet

FIG. 6

| **Root (15)** | | **Repeating Group #1 – (23) #2 – (12)** | | **Description** | |
|---|---|---|---|---|---|
| **Field (Tag)** | Length | Field (Tag) | Length | | |
| **Msg Type** | 0 | | | | 602 |
| **Transact Time** | 8 | | | | |
| **Match Event Indicator** | 1 | | | | |
| **No MD Entries (1)** | 3 | | | | |
| | | MD Update Action | 0 | | 604 |
| | | MD Entry Type | 0 | | |
| | | Security ID | 4 | | |
| | | Rpt Seq | 4 | | |
| | | MD Entry Px | 8 | | |
| | | ConsTradeQty | 4 | Aggregate Quantity at price. | |
| | | NumberOfOrders | 2 | Appearance in lower group. This corresponds to what we currently send in tag 346 – “Number of real orders per instrument that participated in the trade”. | |
| | | Aggressor Side | 1 | | |
| **No OrderIDEntries (2)** | 3 | | | | 606 |
| | | Order ID | 8 | | |
| | | MD Entry Size | 4 | | |

TOKENS, AND THE USE THEREOF, FOR PUBLIC DISTRIBUTION OF MESSAGES HAVING A PRIVATE ASSOCIATION WITH A SUBSET OF THE MESSAGE RECIPIENTS

REFERENCE TO RELATED APPLICATIONS

The present application is a continuation of U.S. application Ser. No. 17/573,201, filed Jan. 11, 2022, which is a continuation of U.S. application Ser. No. 14/705,353, filed May 6, 2015, the entirety of all of which are incorporated by reference herein and relied upon This application is related to U.S. patent application Ser. No. 14/100,788 filed Dec. 9, 2013 now U.S. Pat. No. 9,697,569, U.S. patent application Ser. No. 13/399,364 filed Feb. 17, 2012 now U.S. Pat. No. 11,055,775, U.S. patent application Ser. No. 14/034,742 filed Sep. 24, 2013 now U.S. Pat. No. 10,032,219, and U.S. patent application Ser. No. 14/100,887 filed Dec. 9, 2013, the entire disclosures of which are hereby incorporated by reference.

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces are an alternative to pit based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

One manner in which electronic marketplaces attempt to achieve these goals is by equitably providing access to public market information, such as by efficiently disseminating public data, e.g. market data, prices, etc. or changes thereto, to all market participants, and by separating and restricting the communication of private data, e.g. orders and the responses thereto, from that public information. However, as more traders place more trades, the volume of data being communicated increases as well, increasing the burden on the communication infrastructure and supporting resources that are used to generate and transmit the communications in this manner.

BRIEF DESCRIPTION OF THE DRAWINGS

FIG. 5 depicts an exemplary message structure.

FIG. 6 depicts an exemplary message structure for use with the disclosed embodiments.

DETAILED DESCRIPTION

Figure 1:
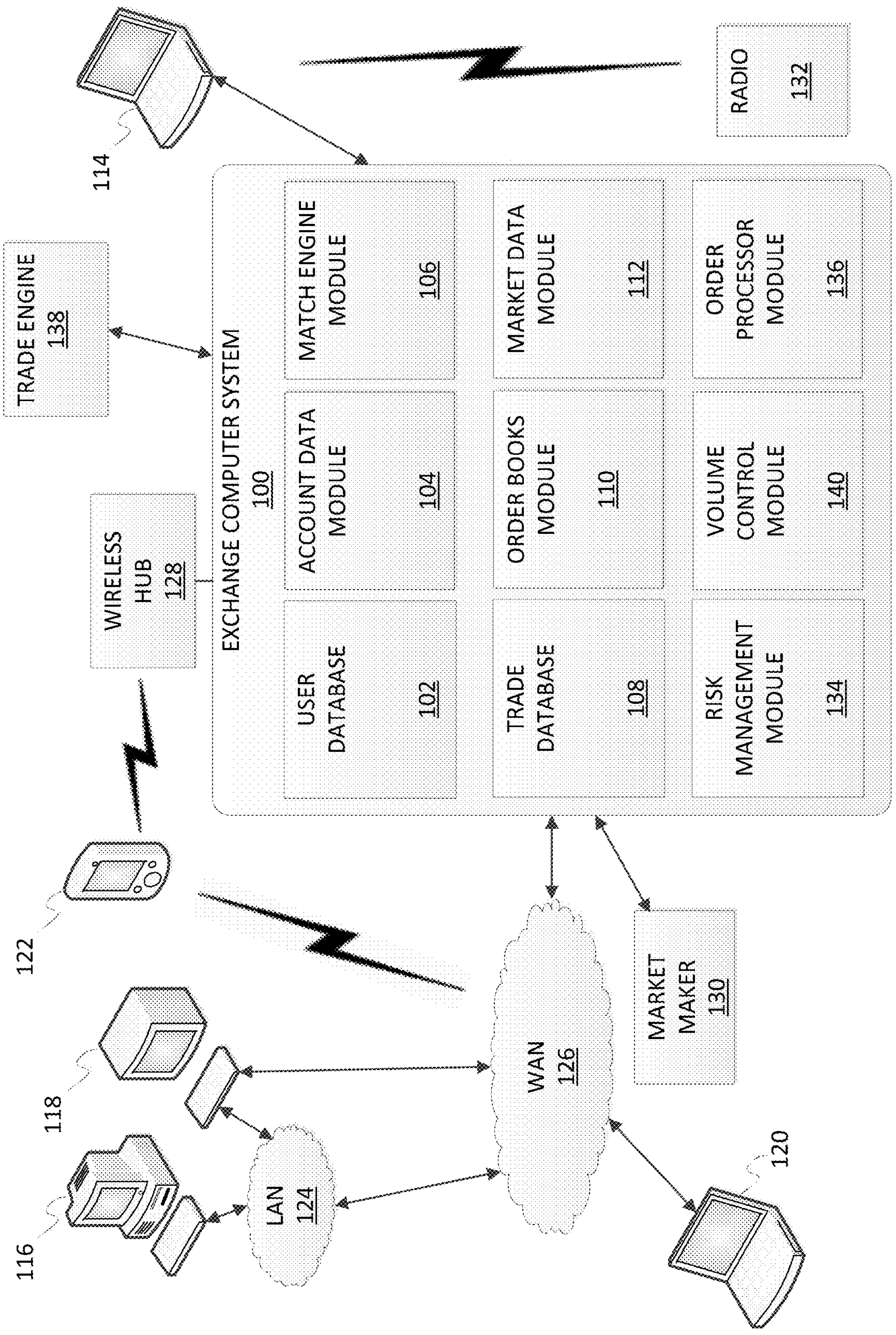
FIG. 1 depicts an illustrative computer network system that may be used to implement aspects of the disclosed embodiments.

The disclosed embodiments relate to creation and dissemination of unique identifiers, i.e. tokens, for use in communication of financial messages from an Exchange, such as the Chicago Mercantile Exchange ("CME"), to all market participants whereby these messages, or at least a portion of the content thereof, indicative of changes in the market, due to one or more trades between two or more market participants, further include, are consolidated, or otherwise combined, with the content of corresponding directed reporting messages, which would be communicated only to the particular market participants participating in the reported trade, while preserving the anonymity of those market participants to which messages would be particularly directed. The identifiers are structured so as to facilitate rapid validation and dissemination while eliminating the ability to associate any given identifier, or set thereof, with a market participant.

In this way, redundant communications, e.g. the directed reporting messages, as well as redundant data, may be eliminated, reducing the overall volume of data being communicated and the resources necessary in support thereof. In addition, inhibition of any one market participant intentionally or unintentionally influencing the market via exposure of their activities, or otherwise unfairly impinging on the exposed activities of other market participants, is maintained. Further, the consolidated messages, or at least the portion of each which relevant to all recipients, are equitably transmitted to all market participants substantially simultaneously over the same medium thereby minimizing or eliminating the occurrence of one market participant receiving market information ahead of the other market participants.

It will be appreciated that the messages described herein may be received simultaneously by market participants, or temporally so close together as to be considered or perceived as being simultaneously received, for example, the difference in their time of receipt is too close to measure or otherwise discriminate among, also referred to as "substantially simultaneously". Accordingly, this may be implementation dependent and depend upon the implemented degree to which time of receipt of a transaction may be measured by the receiver, e.g. based on the implemented number of decimal place or number of bits used to delineate time of receipt, and/or implemented network collision handling mechanisms which arbitrate among multiple transactions, e.g. data packets, headers or the signals indicative thereof, received within a defined time window.

While the disclosed embodiments may be discussed in relation to communications of financial related messages among participants in an electronic trading system, it will be appreciated that the disclosed embodiments may be used for communications among participants which consolidate public and private components in a publicly distributed message. For example, where multiple requestors make requests from a system but each wishes to remain anonymous among all of the other requestors, the system may respond to those requests with a single broadcast message to all of the requestors indicating the status of each request rather than individual response messages. The disclosed embodiments may facilitate such a broadcast message allowing each requestor to know the status of their own request without being able to associate the remaining request statuses with any of the other requestors. Accordingly, with respect to the disclosed electronic trading system embodiment, the term "participant" may refer to a trader, clearing member, market participant, or other user of an electronic trading system and the term "message" may refer to request messages such as orders to trade, e.g. buy or sell, a financial product, requests to modify or cancel previous orders, as well as the response messages thereto, as will be described. However, it will be appreciated that a participant may be any user of a communications system, or may refer to a device used by such as user, and a message, whether requests or responses thereto, may be for any purpose, as described herein.

Further, while the disclosed embodiments may be discussed in relation to futures and/or options on futures trading, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that predictable system responses are maintained.

As used herein, a financial message refers both to messages communicated by market participants to an electronic trading system and vice versa. Financial messages communicated to the electronic trading system, also referred to as "inbound" messages, may include request or order messages, such as trader orders, order modifications, order cancellations and the like, as well as other message types. Financial messages communicated from the electronic trading system, referred to as "outbound" messages, may include messages responsive to inbound messages, such as confirmation or acknowledgment messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example a request to place a trade may result in a response indicative of the trade either being matched with, or being rested on an order book to await, a suitable counter-order. This response may include a message directed solely to the trader who submitted to the order to acknowledge receipt of the order and report whether it was matched, and the extent thereto, or rested. The response may further include a message to all market participants reporting a change in the order book due to the order. This response may take the form of a report of the specific change to the order book, e.g. an order for quantity X at price Y was added to the book (referred to as a Market By Order message), or may simply report the result, e.g. price level Y is now has 5 orders for a total quantity if Z (where Z is the sum of the previous resting quantity plus quantity X of the new order) (referred to as a Market By Price message). In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. As market impacting communications tend to be more important to market participants then non impacting communications, this separation may reduce congestion and or noise among those communications having or reflecting an impact on a market or portion thereof. Furthermore, a particular market data feed may only communicate information related to the top buy/sell prices for a particular product, referred to as "top of book" feed, e.g. only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants. Generally, the disclosed embodiments may be used in conjunction with a restructuring of response messages reflecting market impacting events to reduce redundant data and convey more relevant information about the event to all market participants sooner than less relevant information so that the market participants may comprehend the event more quickly. Furthermore, the disclosed embodiments may be used in conjunction with consolidation of the communication of market impact reflecting response messages, e.g. responsive to inbound messages, with other market impact reflecting messages as will be described. In other implementations, these communications may or may not be further consolidated with non-market impacting messages.

Examples of the various types of market data feeds which may be provided by electronic trading systems, such as the CME, in order to provide different types or subsets of market information or to provide such information in different formats include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index).

Market data feeds may be characterized as providing a "view" or "overview" of a given market, an aggregation or a portion thereof or changes thereto. For example, a market data feed, referred to as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g. only the top 10 resting buy/sell orders and, thereby, only provide a view of that portion. As used herein, a market impacting request may be said to impact the "view" of the market as presented via the market data feed. An MBP feed may utilize different message formats for conveying different types of market impacting events. For example, when a new order is rested on the order book, an MBP message may reflect the current state of the price level to which the order was added, e.g. the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e. report the result of multiple market impacting events in a single message.

Alternatively, a market data feed, referred to as a Market By Order ("MBO") feed, may convey data reflecting a change that occurred to the order book rather than the result of that change, e.g. that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g. as it is modified, canceled, traded, etc.

It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated response to market impacting events which are caused by more than one order, such as a trade, may require the transmission of a significant amount of data to convey the requisite information to the market participants. For trades involving a large number of orders, e.g. a buy order for a quantity of 5000 which matches 5000 sell orders each for a quantity of 1, a significant amount of information may need to be sent, e.g. data indicative of each of the 5000 trades that have participated in the market impacting event.

Referring to FIG. 5, there is shown an exemplary message format for an MBP message for reporting a trade. The format calls for a header portion 502 and a set of nine trade data fields 504, each set accounting for 30 bytes. The header portion 502 include a message type ("MSG Type"), Transaction Time, Match Event Indicator, and Number of Market Data Entries ("No. MD Entries") fields. The trade data fields 504 include a Market Data Update Action indicator ("MD Update Action"), a Market Data Entry Type indicator ("MD Entry Type"), an identifier of the instrument/security ("Security ID") being transacted, a Report Sequence identifier ("Rpt Seq"), the price associated with the transaction ("MD entry Px"), the quantity transacted ("MS Entry Size"), the number of orders involved in the trade ("Number of Order"), a trade identifier ("Trade ID"), and an identifier of the aggressor side ("Aggressor Side"). The nine trade data fields 504 are included for each participating trade so, for the example above, there would be 5000 sets of these nine fields, each with data for one of the 5000 participating trades, or 150,000 bytes. Since all of this data may exceed the capacity of data packet used to convey messages over a network, the MBP message may need to be split into multiple packets separately transmitted via the network to the market participants. For a recipient market participant to be able to comprehend the market impacting event which occurred, they would have to wait to receive all of the packets which comprise the message which may impart delay on the ability of that market participant to respond to the event, especially in a volatile market. In an alternative message format, wherein all trades contributing to an "event" are consolidated, such as by each affected price level, there may be less repetition of fields and an overall smaller message size, but there may be redundant date nevertheless.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788 captioned above, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e. a trade, as well as other general information about the event, an instrument portion which comprises data about each instrument which was traded as part of the transaction, and an order portion which comprises data about each participating order. In one embodiment, the header portion may include a message type ("MSG Type"), Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It will be appreciated that the particular fields included in each portion are implementation dependent and that different fields in addition to, or in lieu of, those listed may be included depending upon the implementation. It will be appreciated that the exemplary fields are compliant with the FIX binary and/or FIX/FAST protocol for the communication of the financial information.

The instrument portion contains a set of fields, e.g. seven fields accounting for 23 bytes, which are repeated for each participating instrument. In complex trades, such as trades involving combination orders or strategies, e.g. spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As will be appreciated, data which would have been repeated for each participating order, is consolidated or otherwise summarized in the header and instrument portions of the message thereby eliminating redundant information and, overall, significantly reducing the size of the message.

For example, for a simple trade of a single instrument as the result of a single buy order and single sell order, the message structure 500 of FIG. 5 would require 18 fields of data (not including the header) or 60 bytes whereas the message structure 600 of FIG. 6, according to one embodiment without order ID, would require 10 fields of data (not including the header) for a total of 31 bytes. Assuming the buy order was for quantity 100 and was matched to 100 sell orders each for quantity 1, the message structure 500 of FIG. 5 would require 909 fields of data (27,270 bytes) whereas the message structure 600 of FIG. 6 would require 109 fields of data (426 bytes without order ID, 1235 bytes with order id). With respect to the message structure 500 of FIG. 5, in one implementation only 46 repeating fields sets 504 would fit in a single data packet necessitating the transmission of over 20 data packets to convey the entire message. With respect to the message structure 600 of FIG. 6, in one implementation, 62 repeating fields sets for the instrument portion 604 and 116 repeating field sets for the order portion 606 may fit within a data packet allowing the entire exemplary message to be sent in a single data packet.

As shown in FIGS. 5 and 6, the field length is the length of the data field in number of bytes. A field length of 0 indicates that neither the field nor any data therefore is actually transmitted but per the communications protocol, e.g. FIX binary or FIX/FAST, is assumed by both the sender and receiver to be present and have a particular value per the communications protocol. For convenience, the foregoing examples, compared the amount of transmitted data for each message structure based on the number of fields of data transmitted and assuming all fields were transmitted. However, the byte counts reflect that some fields are not actually transmitted.

The message structure may further include an order identifier, discussed in more detail below, for each order listed in the order portion 606. In one embodiment the order identifier is a host order number ("HON") but it will be appreciated that the identifier may be any identifier which uniquely identifies the order. By providing the order identifier in the MBP message, the participating traders may be notified that it was their orders which were filled. This would eliminate the need for separately transmitted acknowledgment messages transmitted to each participating trader, greatly reducing the bandwidth of privately transmitted data. As only the participating trader would recognize the order identifier, anonymity is effectively preserved. Furthermore, in implementations using only MBP data feeds, the ability of other market participants to follow the progress of orders using the order identifier is greatly diminished as the data presented in the exemplary MBP message structure only conveys a portion of the progress of the particular order, e.g. the particular quantity which actually traded but not the quantity of the original order or any modifications thereto, etc.

It will be appreciated that adding the order identifier to the message structure 500 of FIG. 5 may introduce a disparity in the dissemination of trade information for large trades requiring a multi-data packet message by allowing participating traders whose orders are indicated in an earlier transmitted packet to learn of their participation sooner than a trader whose orders are indicated in a later transmitted packet. The message structure 600 of FIG. 6 mitigates this problem by reducing the number of packets which may be required to send a given message and thereby compressing the gap between individual trader notifications. In an alternative embodiment, the content of each message packet may be encrypted with the last message packet including the key for decrypting the previously sent packets of the message. This would effectively prevent the recipients from viewing the message content until all packets have been received, effectively normalizing the availability of the message content among all of the recipients. More information about this implementation may be found in U.S. patent application Ser. No. 14/100,887, filed Dec. 9, 2013 now abandoned, the entire disclosure of which is hereby incorporated by reference.

While the disclosed embodiments will be discussed with respect to an MBP market data feed, it will be appreciated that the disclosed embodiments may also be applicable to an MBO market data feed.

Figure 7:
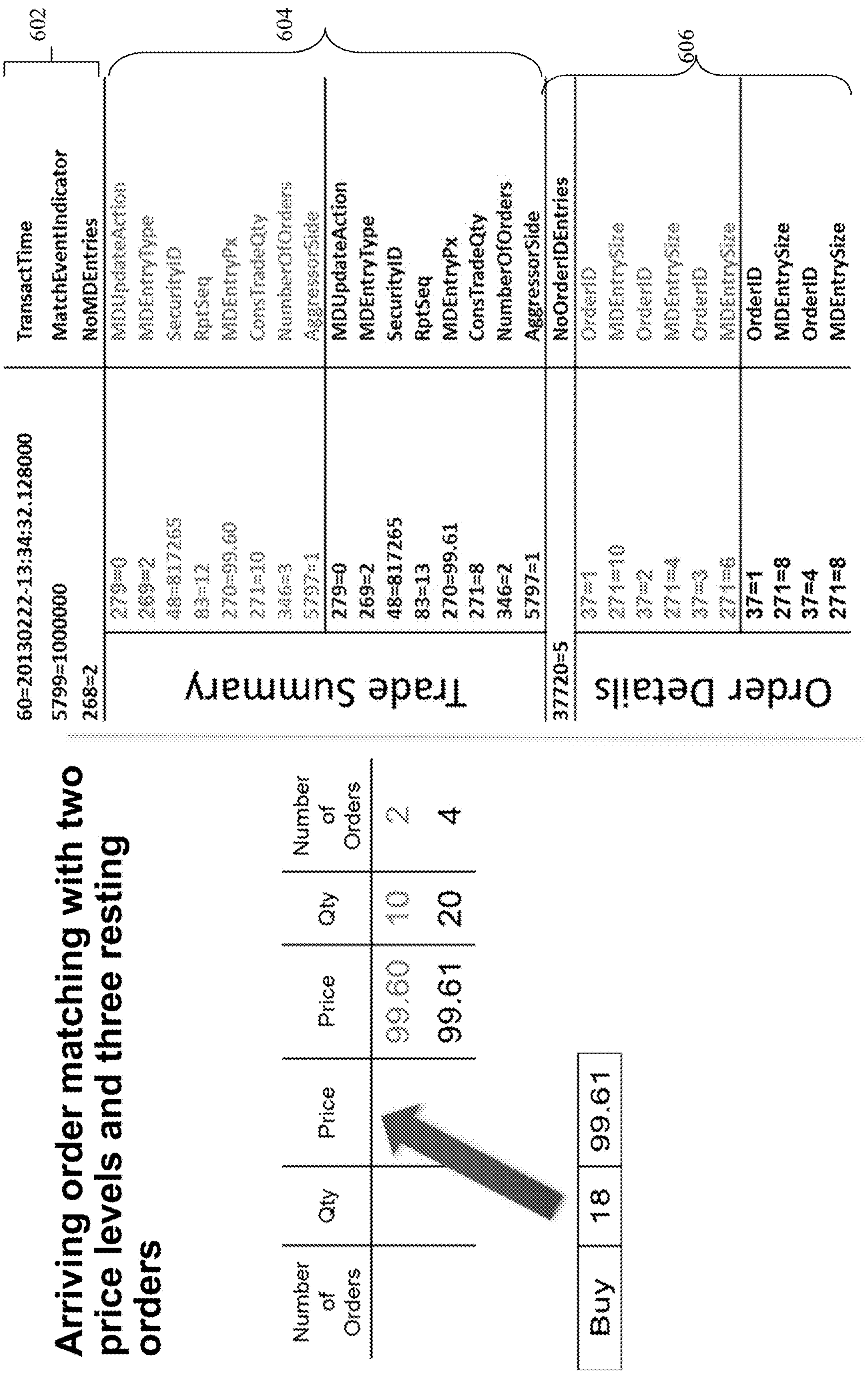
FIG. 7 depicts an exemplary financial message structured in accordance with the message structure of FIG. 6.

An exemplary financial message in accordance with the message structure 600 of FIG. 6 is shown in FIG. 7.

As discussed above, the message structure may further include an order identifier ("Order ID") which identifies the participating order for each order listed in the order portion 606. In one embodiment the order identifier is a host order number ("HON") but it will be appreciated that the identifier may be any identifier which uniquely identifies the order. By providing the order identifier in the MBP feed, the participating traders may be notified that it was their orders which were filled. This would eliminate the need for separately transmitted acknowledgment messages transmitted to each participating trader, greatly reducing the bandwidth of privately transmitted data. As only the participating trader would recognize the order identifier, anonymity is effectively preserved. Furthermore, in implementations using only MBP data feeds, the ability of other market participants to follow the progress of orders using the order identifier is greatly diminished as the data presented in the exemplary MBP message structure only conveys a portion of the progress of the particular order, e.g. the particular quantity which actually traded but not the quantity of the original order or any modifications thereto, etc. However Order ID's may not provide sufficient anonymity protection as they are typically associated with an order to trade and any subsequent modifications thereto. Accordingly, should a trader submit an order and then subsequently modify that order, which may happen repeatedly until the order is fully traded or canceled, other market participants will be able to follow that activity and may be further able to discern a trading strategy therefrom. Despite not being able to be particularly identified, the market participant performing those actions may still be disadvantaged by having their strategy known. This may disincentivize a market participant from participating in a consolidated messaging system as described herein and thereby undermine the advantages thereof, e.g. equitable data access, reduced bandwidth, etc.

However, as discussed above, the disclosed embodiments may eliminate the need for a separate communications feed to transmit a separate response, such as a confirmation message, to a market participant, sent in response to the acceptance and/or processing of a market impacting request message sent thereby, while maintaining anonymity and preventing inter-transaction associations. In particular, the disclosed embodiments augment the outbound market update message, generated based on the acceptance and processing of the request and reflecting the market impact of the request, sent to all market participants, such as via a "by order" market data feed, with a unique identifier, also referred to as a token. The unique identifier, known only to the submitting market participant and/or their designees, as well as the electronic trading system/Exchange, as will be described, allows that market participant to recognize the market update message as further confirming the acceptance and/or processing of their request or otherwise being associated therewith. However, other market participants, to which the unique identifier is unknown, are only privy to the market impact reflected in the message but otherwise cannot discern which market participant submitted the underlying request. Furthermore, by guaranteeing uniqueness among tokens, as will be described, inter-transactional associations, such the discerning a trading strategy, is prevented.

As described in more detail in U.S. patent application Ser. No. 13/399,364, captioned above, market participants may generate their own unique identifiers and include them with their request messages while also maintaining a record or other accounting of which request message corresponds with which unique identifier. When generating the outbound message responsive to a particular request, the electronic trading system may then copy the unique identifier from the underlying request and augment the outbound message with it. The market participant, upon receipt of the outbound message, may then correlate the unique identifier with their accounting to further associate the outbound message with the corresponding request message.

As will be appreciated, to ensure anonymity, the unique identifiers must be unique to each market participant and unknown to other market participants. Further, to minimize the chance that market participants, while not knowing who the outbound messages are associated with, may observe, discern, or otherwise derive patterns of behavior of any one market participant, regardless of whether that participant may be specifically identified, from the flow of outbound messages which may prove advantageous as described above, the unique identifiers may further be unique to each outbound message. In one embodiment, the unique identifiers are arbitrary and themselves convey no information about the market participants or request messages they may be associated with.

In one embodiment, the electronic trading system generates, e.g. randomly or pseudo randomly, the unique identifiers and then allocates, e.g. randomly or pseudo randomly, unique identifiers to each market participant to use with their requests. The unique identifiers may be generated and/or allocated upon request, in advance, or combinations thereof. In one implementation, a secure interface is provided by which a market participant may request one or more unique identifiers be allocated to them which are then securely communicated so as to protect the anonymous integrity thereof. For example, at the beginning of each trading day, each market participant may log in to a secure server via a network and download an allocation of unique identifiers. The number of unique identifiers allocated to a particular market participant may be implementation dependent and may be limited as will be described below. For example, the number of allocated unique identifiers may range anywhere from 1 to 250,000 or more depending upon the expected and/or desired message volume of the market participant and other factors and may be different for different market participants. Alternatively, unique identifiers may be generated and/or allocated on an as needed basis throughout the trading day. It will be appreciated that there may be numerous methodologies, e.g. true random or pseudo-random, which may be used to define the structure, e.g. size and format, of the unique identifiers and further randomly generate and further randomly allocate the generated unique identifiers to ensure that a sufficient number of unique identifiers are available for the expected message volume within a particular period, i.e. without being reused, and that it is substantially unlikely that any market participant may derive a relationship among an allocation of unique identifiers or the association of an allocation with a market participant. In one embodiment, unique identifiers comprise a 256 bit numeric value. The unique identifiers may comprise a numeric, alphanumeric and/or binary value. In one embodiment, unique identifiers may be reused, e.g. randomly reallocated, after an event and/or on a periodic basis, such as after the token is released (immediately or delayed) (as described in more detail below), at the end of each trading session/day, or annually.

In one embodiment where the market participant is required to include a unique identifier with each of their requests, which is then subsequently used by the electronic trading systems to augment the outbound messages responsive thereto, and further where the unique identifier is not used as a mechanism to limit requests, as will be described below, the electronic trading system need not track the use of unique identifiers, once allocated, simplifying the implementation thereof. Instead, it may be the responsibility of the market participant to ensure that each unique identifier is used only once as prescribed. In an alternative embodiment, the electronic trading system may implement a limited verification mechanism to ensure that one market participant does not intentionally (such as by reusing a token gleaned from a previously transmitted outbound message) or inadvertently utilize an identifier allocated to another market participant, such as by implementing the encryption of the identifiers as described elsewhere herein. Still further, as will be described below, in another embodiment, the electronic trading system may undertake responsibility for ensuring that participants use a participant-assigned and unique token with each request by validating tokens included in requests to ensure they are assigned to the requesting participant and have not been previously used. It will be appreciated that, given a large enough token-space, e.g. 256 bits or larger, and a requirement for users to generate truly random tokens, that the probability of collisions may be so low as to alleviate a need to validate token uniqueness by the electronic trading system.

In one embodiment, rather than the market participant including a unique identifier with each request, the electronic trading system may maintain a copy of the market participants' allocations and, for each suitable outbound message, select a unique identifier from the appropriate market participant's allocation, randomly or in a defined sequence. The market participants then check the unique identifiers of the outbound messages against their allocation to determine if the outbound message is associated with one of their requests. While this may impede the ability to correlate specific requests with specific outbound messages, it may improve the security of the communications by preventing interception of the request messages to discern the unique identifiers associated therewith. It will be appreciated that other data may be added to the outbound message to allow a market participant to correlate the outbound message with the underlying request message once they have determined that the outbound message is associated with one of their requests. Such data may include a time/date stamp, a serial number or some other data which, while not unique among market participants, is unique among the request messages sent by any one market participant.

The consolidated message format, which may be referred to as a "trade summary message," described above generally allows all market participants to know that a trade has taken place, as well as letting the participants of that trade know that their orders had traded was well. As was described, it is fully consolidated, allowing a much smaller message volume than would be consumed by publishing individual confirmation, e.g. fill, messages, to each participant participating in an event and then updating the market data feed. However, in order to accomplish this, as was described, some form of order identifier, e.g. the participant's order ID's, would need to be included in this trade summary. As was previously discussed, there are many participants that routinely modify orders on the books as part of their trading strategy, but such an operation does not change the order ID so that the modifications can be related to each other and the original order. This means that the trade summary message would leak breadcrumbs of a participant's strategies to the other participants which may prove a disadvantage. While an option to opt in or out of the trade summary message may be provided, opting out would undermine the purposes of the trade summary message, e.g. to let all participants know of their trades at the same time. Accordingly with the current trade summary message process, the market as a whole may know the state of the market, but individual participants may not know if their individual positions have been affected. If all participants opted in to include their order ID's in the trade summary message, redundant separate fill messages could be eliminated. For more detail, refer to pending U.S. patent application Ser. No. 13/399,364, captioned above.

Another problem relates to message ordering. Currently, if a participant were to opt in to the consolidated trade summary message there is a chance that the acknowledgment message sent acknowledging receipt of an incoming request/order, containing the order ID assigned to the order, would arrive after the trade summary message due to inconsistent network traffic flow, such as race condition, network congestion, network resource contention, etc. This may be a problem because, at the time the client receives the trade summary message reflecting their transaction, they do not yet know their exchange assigned order ID and therefore cannot know if they were a participant in the trade. This problem is currently solved via a series of pacing measures to ensure proper ordering of the network traffic. However, since pacing is an approximation, there is chance that the acknowledgment message will still arrive after the trade summary message. Also, pacing adds a delay to the electronic trading system, which is non-ideal in an industry where network speed is often compared against the speed of light and the length of network cables within the trading system data center.

The disclosed embodiments relate to an improvement to the process of confirming trade activity to market participants which utilizes a token distribution system which, in one embodiment, may be located at each Market Segment Gateway ("MSG"), i.e. the point of ingress/entry for all transactions, i.e. the network traffic/packets containing the data therefore, specific to a single market at which the order of receipt of those transactions may be ascribed, e.g. for the purpose of deterministic operation of the market. The electronic trading system may include multiple MSG's, one for each market/product implemented thereby. For more detail on deterministic operation in a trading system, see U.S. patent application Ser. No. 14/074,667 entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE" and filed on Nov. 7, 2013, herein incorporated by reference. In one embodiment, the disclosed token distribution system tracks all tokens that are allocated or in use, is able to quickly check and/or modify the state of a token and quickly assign new tokens. As will be described, token states may include an "allocated" state and an "unallocated" state based on whether the token is assigned to a particular user or not. Alternatively, more granular states may be defined such as allocated, unallocated, as well as "associated" to indicate that the token has been used in a pending request message. It will be appreciated that the use of a token in a request message may be denoted by other means. Using the disclosed system, market participants are not able to associate individual tokens or sequences of tokens with other market participants based on the messages communicated to them by the system. The system may also allow for market participant-defined tokens, with or without user verification and/or collision prevention. It will be appreciated, as will be further described below, that the disclosed token generation, validation, allocation and dissemination/distribution mechanisms may be implemented elsewhere within the electronic trading system, such as at a central location, logical and/or physical, where tokens are disseminated for use in all markets handled by the electronic trading system. Hybrid dissemination, whereby a portion of the generation, validation, allocation and distribution is handled centrally and a portion is handled in a distributed manner, such as at each MSG, are also contemplated. Generally, as will be described, the disclosed embodiments require that any given token proposed to be used for a request, in order to be utilized for the described purpose, be unique at least among a set of tokens already in use, e.g. utilized in a request from one of a set of participants but not yet utilized in a response to that request to all participants, for transactions among a given set of participants all of to whom the results of those transactions will be reported.

The disclosed token allocation process may deliver a finite set of tokens to each market participant, such as on a periodic basis, e.g. weekly, daily, at the beginning of each trading session, etc., with a participant being able to request additional tokens as needed. The number of tokens delivered may be based on a participant-requested amount or defined by the electronic trading system, e.g. a fixed amount or otherwise dynamically determined, such as based on historical trading volume of the participant or average volume among all, or a subset, of the participants. Each incoming request for a new order or order modification may include its own token taken from the allocation and is verified, upon receipt by the system, against that client's set of allocated tokens. The system may reject the request if it is associated with an exchange-defined token that is not valid, e.g. not allocated to the market participant who sent the order or has previously been used. While a given allocation set of tokens may be characterized by an order in which they have been generated and/or stored in a memory or other database, as will be described, the tokens within a set of tokens defined by the predictable component described below, due to a random component thereof, may otherwise not characterized by any form of sequence, order or other intra-token relationship allowing one token to be determined from another token or otherwise to determine that one token is from the same set as another token.

When a market participant submits a new order, the market segment gateway determines whether the token is exchange-defined or user-defined (if allowed). If the token exchange-defined, the system verifies that the token has been allocated to the client and has not already been used. If the token is not valid, the order may be rejected. If the token is user-defined, the order is passed to the match engine. User defined tokens allow a participant to generate and provide their own tokens with requests which will be used in the responses thereto as described. However, the responsibility for ensuring token uniqueness or otherwise that other participants will be unable to discern the relationship of the token to the participant or to other requests, falls upon the user.

When a market participant submits an order modification to modify a previously submitted order, in one embodiment the market participant may or may not include a new token. Accordingly, the MSG may determine whether a token is in included in an order modification request or not, i.e. the token comprises a null value. If no token is included, no further action with respect to the token is taken and the original token submitted with the initial request/order will be used to identify that order, as modified, in any resultant response message as further described. If the order modification message includes a token, i.e. the token is a non-null value, the new token is verified. If the token is invalid, then the modification request may be rejected. Otherwise, the old token from the order that was just modified is then removed from the in-use list as will be described, and the new token is added or otherwise associated with the modified order. The new token will thus be used in any subsequently generated response message thereby preventing association of the initial request/order and the subsequent modification thereof.

In a centralized token dissemination system, as opposed to a distributed system, e.g. distributed among MSG's, the tokens may be globally unique across the entire trading system and market participants need only make a request to a single source/system for an allocation of tokens. A distributed token dissemination system, as will be described, may permit tokens to be unique only to each point of dissemination, e.g. each MSG, which may reduce the token size and improve validation latency as will be described. Furthermore, network traffic may be reduced by isolating token allocation requests and responses at network ingress locations.

It will be appreciated that tokens, generally, may be a commonly used function of websites to track user sessions. However tokens used for such purposes are typically very large, e.g. 256 bits or more, which itself minimizes collisions, i.e. the generation of identical tokens, and typically embed an identifier of the user. Embedding a user's unique ID into the token is not only allowed, but standard practice as its an easy way to ensure uniqueness, and since the remainder is a secure random number, the session token is still secure and unique to the user. However, if the disclosed embodiments utilized a user identifier and it became public knowledge that this identifier were being encoded, participants' strategies may become public knowledge, in effect, instantly. Thus, the disclosed embodiments do not encode or use the participants' identifying information in any way to generate tokens.

Similarly, often tokens are stored in a database subsequent to being generated, regardless of including a user ID in the token. A newly generated token, before being distributed for use, is then verified against the database to ensure it is unique, i.e. no collision, and, once verified, is itself stored in the database. If newly generated token is found not be unique among the set of stored previously generated tokens, referred to as a "collision," then it is discarded and another token is generated. This process continues until the requisite number of tokens is generated. While a delay, e.g. of several millisecond, may be required to perform this validation and may be acceptable for the relatively infrequent case of a website implementation where a user requires a new token, the frequency and latency requirements of the system disclosed herein require a minimal generation/validation delay. Thus the disclosed embodiments further feature a mechanism to store all allocated tokens in a quick to access data structure such that new tokens can be verified as unique quickly.

"Globally Unique Identifier" ("GUID") are another form of unique identification but these values are typically limited to 128 bits typically used to pack together information about other data, usually two 64 bit/8 byte data values (referred to as "long"). However such systems do not guarantee uniqueness among the identifiers which, as described herein, is required.

Other token systems are available, e.g. mongoid_token (https://github.com/thetron/mongoid_token) which is an open source program which generates unique identifiers, or systems disclosed in U.S. Pat. Nos. 7,010,565 and 7,774,370. However these systems do not provide the necessary guarantee of uniqueness as is required in the disclosed system.

As described above, the disclosed embodiments may operate in each MSG which may allows for simplified handling of concurrency issues, network latency, etc. by having this service be separate for each Market segment and implemented at the point or order ingress where incoming token validation may be most efficiently handled. However this may require a participant to make several token allocation requests when using different MSG's, e.g. when transacting in multiple markets. In other embodiments, a single, unified token distribution service may be provided, but may result in additional network traffic or delay, e.g. having to centrally respond to all token allocation requests and validation processes. However, this may simplify the token allocation request process for participants as they need only make one request for an allocation of tokens. Distributing the disclosed functionality among MSG's and, for example, encoding an identifier of the MSG into the token provides for a universally unique identifier without the need for such a unified system, preventing any market participant from divining inter- or intra-market trading strategies of another marker participant. This further distributes the processing load associated with token allocation and validation and minimize the network traffic caused thereby over the internal trading system network. It will be appreciated that the segmentation of the disclosed token generation, validation, allocation and dissemination may be implementation dependent and depend upon the nature of the messages being communicated and the segmentation of the system generating such messages. For example, token dissemination may be segmented by product, e.g. security, such as by International Securities Identification Number ("ISIN") which uniquely identifies a security. Its structure is defined in ISO 6166. Securities for which ISINs are issued include bonds, commercial paper, stocks and warrants. The ISIN code is a 12-character alpha-numerical code that does not contain information characterizing financial instruments but serves for uniform identification of a security at trading and settlement. The ISIN could be encoded into the token instead of, or in addition to, the MSG and day.

As will be discussed, the disclosed embodiments may:

keep track of all tokens that are allocated or in use be able to quickly check the state of a token be able to quickly assign new tokens be able to prevent-participants from being able to connect individual or a set of tokens to other participants.

In one embodiment, the token used by the disclosed embodiments has four parts:

a. A portion which indicates whether the token was generated by the disclosed embodiments or by the participant, as was described above, e.g. Byte 0, Bit 0: where 0 indicates system generated, 1 indicates a customer provided token (where the customer wishes to generate their own tokens and accepts responsibility for proper token generation, uniqueness, etc. It will be appreciated that if participant defined tokens are not permitted, this portion may not be implemented.

b. A portion which identifies the MSG, e.g. Byte 0, Bits 1-7: MSG ID. An identifier for the MSG, allowing tokens to be unique per MSG. It will be appreciated that in a centralized system, this portion may not be needed or provided. This may form part of what is referred to as the "predictable portion" of the disclosed token. It will be appreciated that if a centrally distributed token dissemination system is used or the electronic trading system features only a single MSG, this portion may not be implemented.

c. A portion identifying a set, window, date, or other temporal or grouping indicator, of generation and/or allocation to the participant, which may also be part of the token's predictable portion, e.g. Bytes 1-2: Date the token was allocated to a client (days since epoch). This allows for minimization of the number of prior generated/validated tokens that need to be compared to a new candidate token to ensure it is unique, thereby minimizing the validation time and accelerating the rate at which tokens may be disseminated.

d. A portion which is random, referred to as the "random portion" of the token," e.g. Bytes 3-7: Randomness for the token. The random portion may contain a substantially random number. As used herein, the term "substantially random" may refer to a truly random or algorithmically generated pseudo random value wherein a sequence or other ordering of the value as compared to other such values is not readily discernable, i.e. (1) the values are uniformly distributed over a defined interval or set, and (2) it is substantially impossible to predict future values based on past or present ones. The number of bits/bytes comprising the random portion may be vary depending upon the implementation and may be increased to reduce the probability of collisions and/or increase the number of potential tokens.

It will be appreciated that the overall size, e.g. number of bits, of the token may be increased to thereby increase the number of potential tokens and reduce the probability of collisions (each of which doubles the token creation time) and that token size is implementation dependent and may be limited by the size of the request and/or response messages.

In the disclosed embodiments the entire token value is further non-zero and also not the maximum value that the token bits may represent, e.g. not the maximum value representable as a primitive (a binary value comprising 0 followed by all 1's for the field length), e.g. not MAX_LONG.

Furthermore, as discussed above, in the disclosed system tokens are unique. The generation of unique tokens requires that each newly generated token be validated against previously generated/validated tokens to ensure it is unique. This process, as described above, is simplified by having a predictable portion of the token, thus limiting the scope of previously generated tokens against which a newly generated token must be validated. Each newly and randomly generated token would need to be verified against all other outstanding tokens to ensure that it is indeed unique. But, since, in at least one embodiment, MSG ID and allocation date is specified in the token, new tokens only need to be verified against tokens generated with same date for the same MSG. This, for example, may reduce possible combinations from 2^64 down to 2^40, i.e. by a factor of 16 million.

In one embodiment, tokens are generated and allocated on demand, i.e. upon request of a participant. Alternatively, tokens may be generated and validated in advance but allocated on demand, or automatically allocated. By at least generating and validating tokens in advance, such by an independent processing thread, tokens may be queued/buffered for allocation allowing a quick response in allocating and distributing new unique tokens upon receipt of a request by a market participant.

Generally, the disclosed embodiments may operate under the following constraints, which are implementation dependent:

each participant can only have a finite set of tokens allocated but not in use, e.g. not having been included or otherwise associated with a request message, e.g. a trade order, order modification, etc.

Each incoming request for a new order, or request for an order modification needs to be verified against that participant's set of allocated and in use tokens. A request may be rejected if it has an exchange defined token that is not valid (in use) and/or not allocated to that participant.

In operation, the disclosed embodiments may receive a request for tokens, which may be referred to as a "basic request," and may specify the number of tokens requested. As described above, such requests may be made using a secure communications protocol, such as HTTPS, PGP, etc., and/or via a secure portal, such as an encrypted web portal, which provides for secure delivery of the requested tokens. The system may then respond with the requested number of tokens, subject, in one alternative embodiment, to a maximum limit per request, per time period, overall, etc. Alternatively, the system may automatically determine the number of tokens to send to a requesting participant wherein the number of tokens disseminated per request is defined/fixed, e.g. 10,000 tokens, or dynamic, such as based in historical activity of the participant or an average of all participants. For example, as a participant requires a unique token for each message they send, the system may estimate the number of messages expected to be sent by the participant over a particular period and disseminate a sufficient number of tokens therefore, wherein the participant may request more if necessary. It will be appreciated that token dissemination may be used as a method of limiting participant activity and therefore the number of tokens disseminated per request or within a particular time period (or overall) may be limited so as to limit the number of request messages which participant may send.

In one embodiment, a participant may re-request that the system send previously allocated tokens or just those tokens of a previous allocation which remain unused. The disclosed embodiments would then respond to the request by determining the previously allocated, and possibly unused, tokens and resending to the participant. A participant validation process may be implemented to ensure the request is coming from the participant and not from at third party, such as a login/password, two-factor authentication, etc.

In one embodiment, when a participant sends a request for a new transaction, e.g. a request for a new order, they include one of their yet-unused tokens in the request message that they send to the MSG. The MSG extracts the token from the request message and, if generated by the system, verifies that the token is allocated to the participant from which the request was received and that the token has not been previously used or otherwise associated with a prior request. The MSG may include, or otherwise be coupled with, a buffer, cache, memory, database, content addressable memory, data store or other data storage mechanism, or combinations thereof, which stores data indicative of allocated tokens and identifying the participant to whom the tokens are allocated along with other data such as a flag to indicate if the token has been used in a prior request message, etc. The allocated tokens may be stored in a data structure such as a hash table, lookup table, or other data structure which may facilitate rapid determination of the existence of a stored token, the identify of the participant to whom the stored token is allocated, and/or whether the token has been previously used. The data storage may be the same data storage in which newly generated, but not yet allocated, tokens are stored.

If the token fails this verification, the request/order may be rejected. If the tokens was generated by the participant or the token is valid, the request, including the token, is passed to the transaction processing system, e.g. the match engine. Once processed, at least the response message generated by the transaction processing system, as described herein, and sent to all participants will include the token to allow the participant to identify the response as being associated with their request. In one embodiment, a special use case may be provided where the token specified in the request is 0. In this case, the MSG or the transaction processing system may generate a random token to be included in the response message, which may or may not be guaranteed as unique.

In one embodiment, if a participant wishes to modify a previously sent request, e.g. a prior order which has not yet been processed or traded, they may send a request message comprising a request to modify the prior request. In this case, the participant may have the choice to include a new token or may choose not to include a token, i.e. the token in the request is a NULL value. In one embodiment, it may be required that all such requests use a new/unique token. If no token is specified, then the request to modify the prior order is passed to the transaction processing system to modify the prior request and any response message generated based on the modified request will utilize the token provided with the original request. However, if a new token is provided, the new token will be verified as being allocated to the participant from which the request was received and as being unused. If invalid the request may be rejected. If valid, the request will be passed on to the transaction processing system and any response to the modified prior request will utilize the new token. In one embodiment, once the new token is verified, the token associated with the prior request may be removed from the database or otherwise updated to reflect it being unused such that the participant may re-use the token. Alternatively, the token associated with the prior request remains denoted as used.

It will be appreciated that the disclosed embodiments may be used in any situation where a unique token is required to be delivered quickly and quickly recycled when its use is done. For example, the disclosed system could be used for ISIN distribution/assignment for user defined spread transactions in an electronic trading system.

In an alternative embodiment, tokens may not be allocated and/or disseminated to participants in advance of those participants sending requests to the system. Instead, tokens are allocated, associated with an incoming request and/or disseminated as requests are received wherein the communications protocol by which the requests are received is used to report the assigned/associated token back to the participant that sent the request so that they "know" it before they receive any response message thereto. In particular, in one embodiment, upon receipt of a request, a token is allocated and included in a TCP shallow acknowledgment transmission sent back to the participant acknowledging receipt of the request. It will be appreciated that while this shallow acknowledgment is, in some sense, a response to the request, it is not considered a response as used herein as it is not response to the underlying content of the request, e.g. it does not confirm the processing of an order included in the request. The participant, i.e. their device, then sends back a TCP acknowledgment which acknowledges receipt of the shallow acknowledgment and token. A process of reusing/recycling tokens may further be provided such as by having the transaction processing system indicate, immediately or after a defined delay, to the MSG that a token has been used in a response message and is therefore available to be reused. The participant, or their device, then makes note of the token such that they may recognize it in the eventual response they receive to their request.

In this embodiment, the token may comprise:

a. A portion which indicates whether the token was generated by the disclosed embodiments or by the participant, e.g. Byte 0, Bit 0: where 0 indicates system generated, 1 indicates a customer provided token (where the customer wishes to generate their own tokens and accepts responsibility for proper token generation, uniqueness, etc. If user defined tokens are not permitted, this portion may not be included.

b. A portion which identifies the MSG, e.g. Byte 0, Bits 1-7: MSG ID. An identifier for the MSG, allowing tokens to be unique per MSG. It will be appreciated that in a centralized system, this portion may not be needed or provided. This may form part of what is referred to as the "predictable portion" of the disclosed token. In a centrally distributed embodiment or a system which only includes one MSG, this portion may not be included.

c. A portion which is random, referred to as the "random portion" of the token," e.g. Bytes 3-7: Randomness for the token. The random portion may contain a substantially random number. As used herein, the term "substantially random" may refer to a truly random or algorithmically generated pseudo random value wherein a sequence or other ordering of the value as compared to other such values is not readily discernable, i.e. (1) the values are uniformly distributed over a defined interval or set, and (2) it is substantially impossible to predict future values based on past or present ones.

In this embodiment, it may only be necessary that currently in-use tokens, e.g. tokens which were associated with a request but not yet included in a final response (indicative of full satisfaction/completion of the request) thereto, not included in a canceled request, or not yet superseded by a new token associated with a request modification, need be unique but that, once used, e.g. included in a final response to a request (indicative of full satisfaction/completion thereof), included in a canceled request, or otherwise superseded by another token of a request modification, may be reused, immediately or subsequent to a defined delay. This would minimize the token generation/validation process and/or the amount of storage necessary to store pre-generated but not yet allocated tokens.

In particular, in one embodiment, upon receipt of a request for a new transaction, e.g. a new order, the MSG or other receiving device, may select a token from a previously generated and validated set of tokens, which may be stored in a memory as described above. A sufficient number of tokens may be pre-generated and validated to handle the anticipated number of pending transactions expected to need an "in-use" token during a particular time period, e.g. a trading session. The request is sent using the TCP protocol. Upon receipt of the request, the MSG selects the token to be used and sends a preliminary acknowledgment, referred to as a "shallow" TCP acknowledgment, back to the participant which merely provides the associated token but does not fully acknowledge receipt and processing of the received request. This shallow acknowledgement may further include an identifier of market segment and an order checksum. The MSG then awaits a TCP acknowledgment of receipt of the shallow acknowledgment from the participant and, upon receipt thereof, forwards the request to the transaction processing system along with the associated token and issues a full acknowledgement of the processing of the request back to the requestor. The associated token is further denoted as being in-use, allocated, or otherwise removed from the set of available tokens. If the acknowledgment is not received from the participant within the time period defined by the communications protocol, the request may be rejected or the token may be deemed to be allocated (wherein an unacknowledged allocated token may be considered "orphaned" and deallocated/cleaned up on a periodic basis). As described elsewhere, the transaction processing system, when generating a response to the request, will then include the associated token therein. The transaction processing system may then notify, immediately or after a defined delay, e.g. 5 seconds, the MSG that the token is again available for use. The MSG may then denote the token as unused or otherwise add it back to the set of available tokens. It will be appreciated that it may be the MSG that implements the token reuse delay rather than the transaction processing system. Delaying reuse of tokens may prevent confusion among the market participants as to whether a token included in a subsequent response message is applicable to a prior request.

Similarly, if the received request is a request to modify a prior request, the MSG may select and provide a new token as described above. However, if the acknowledgment of the shallow acknowledgment is not received within the time window defined by the communications protocol, the request to modify the prior request may still be forwarded to the transaction processing system without the new token. However, the transaction processing system, when preparing the response to the modified request, will utilize both tokens which may be acceptable as both tokens will be unique and may not be reissued immediately. Once used in a response message, the transaction processing system indicates, immediately or after a delay, to the MSG that the tokens are again available for reuse.

It will be appreciated that the above disclosed embodiment may require data structures, stored in a memory other storage, to track pre-generated/validated tokens and/or track those tokens which are in use. Such data structures may be implemented as a concurrent hash set. As discussed above, for pre-generated tokens, a sufficient amount of tokens may need be stored to cover the number of expected tokens to be in use and/or the expected rate of token consumption and recycling.

In an alternative embodiment, tokens may be generated/derived upon receipt of a request based upon the content of the request itself, or a portion thereof, such as by using the content, or a derivative thereof, as a seed for a token generation process, such as a hash function or other random token generation process. The requestor, having knowledge of the request content and the token generation process, may themselves perform the same token generation process to generate or otherwise derive the same token. This would alleviate the need for a mechanism to generate, allocate, track and validate tokens as well as transmit the tokens back to the requestor, as was described above, along with eliminating the corresponding latency added to the electronic trading system thereby. In this embodiment then, only a participant with knowledge of the request, which generally will only be the participant who sent the request, could derive the token and thereby associate any subsequent response with the requestor. Participants not having knowledge of the request will not be able to derive the token and thereby will not be able to associate any subsequent response with either the requestor or the original request. In one implementation, requests may be encrypted to protect them in transit.

In one exemplary embodiment, the incoming request itself, e.g. the inbound order entry, which may be referred to as an iLink message, to determine a token in a systematic but secure way by using a cryptograph hashing algorithm. iLink is bidirectional communications/message protocol/message format implemented by the Chicago Mercantile Exchange Inc. This embodiment utilizes a hash value (referred to simply as "hash"), which is the result of a hash function applied to or otherwise derived from the message, as the token and, for the purposes of this description, the terms hash and token may be used interchangeably. However, it will be appreciated that other functions, aside from hash functions, may be utilized to derive a unique token from some or all of the message content and that all such functions are contemplated herein.

Effectively, the participant, using a predefined hash function in a predefined manner known to them and to the electronic trading system, will hash their inbound request messages, e.g. their order entry or order modification messages, to generate private tokens comprising the hash value, which only they will have. The electronic trading system/exchange, upon receipt of a request message, will independently generate this hash value given the following procedure and publish it as part of related market data messages. Then market participants may then correlate their request messages with the market data messages to determine if they were part of a market event as described above.

The disclosed embodiments may make use of an existing cryptographically secure hashing algorithm which is a hash function which is considered practically impossible to invert, that is, to recreate the input data from its hash value alone, also referred to as a "one way" hash function. In one implementation, the hash function may produce a hash value in excess of 265 bits, may considered a one way function in that it is computationally impractical for the values of the message to be determined from the hash alone, may be characterized by an avalanche effect, where a small change in the message (such as replacement of a single character) produces a significantly different output/hash value, may be able to be implemented efficiently in hardware. Further, generally speaking, the hash function is configured such that the only practical and technically feasible way for two messages to have the same hash, is if the two messages were identical. In one embodiment, the hash function includes a standard variant of the Secure Hash Algorithm ("SHA")-3 or SHA-2. Alternatively, or in addition thereto, a non-standard, proprietary and/or novel hash function may be used. In one embodiment, the hash function used may have no known attacks, practical or theoretical.

The disclosed embodiments may further provide a mechanism to alter or change the designated hash function and disseminate the new or modified hash function to all participants within a reasonable amount of time should there be vulnerabilities in the function currently in use.

As discussed, the hash function must be known to both the participants and the electronic trading system. Further the input parameters, including the ordering and formatting of the input value(s), to the hashing function must also be known to both. By knowing both the hash function and the input parameters thereto, both a requesting participant and the electronic trading system, both having knowledge of the request message, can generate the same hash/token value. However, another participant having no knowledge of the request message may not generate the hash/token value despite having knowledge of the hash function and the input parameters thereto, nor may they determine any portion of the request despite having knowledge of the hash/token, e.g. from the response message. In particular, the input parameters may include a publicly defined subset of the fields, along with a defined ordering and formatting thereof, that are sent as part of request message, e.g. a trade order or order modification request (orders, cancel/modify, mass quotes, etc.) That subset of fields may include a mix of verified fields unique to the participant or their market connection session, fields verified to be unique to each message that a participant will send, and/or fields that impact the request itself. It will be appreciated that, as opposed to a subset of the message content, the entirety of the message may also be used. It will further be appreciated that the subset of fields used may be implementation dependent and may be selected to ensure that unique tokens are generated, i.e. the token space is large enough and collisions are minimized, such as within a trading session or within another defined time period, while minimizing computational resources necessary to compute the hash value.

For example, by including exchange verified fields, i.e. fields whose values are checked for presence and/or validity upon receipt by the electronic trading system in order to determine whether to accept or reject a request message, which include message content/data which is unique to each participant or participant's session, it may be known that there is a part of the message that is unique to each participant. Exemplary exchange verified fields include Firm ID, Trader ID and Session ID. Use of these fields as at least part of the hash function input may greatly decrease the likelihood of collisions between messages and/or participants. Exemplary fields include the senderCompID (Tag 49) and SenderLocationID (Tag 142), defined by the FIX protocol, both of which are exchange verified, and required for a trade order to be placed and routed properly by the electronic trading system. Further, by including as hash function input, message fields that are likely unique, or only likely generate a minimal number of collisions, to each message that a participant will send to a particular market segment, i.e. MSG, the likelihood of hash collisions may be further decreased. Exemplary fields include Sending time (tag 52) and Message sequence number (tag 34) as defined by the FIX protocol. These fields may not be currently verified as unique to each message received from a participant but may nevertheless decrease the likelihood of a collision between two request messages, e.g. two orders, submitted by the same participant.

Furthermore, by including in the hash function input only those fields from a given request that have some form of impact on the processing of their request, participants may be disincentivized from intentionally causing or attempting to cause a collision because doing so may impact the result of their request, e.g. their market position and/or risk exposure. It will be appreciated that the easiest way to cause a collision may be to submit the same, identical request twice. However, normal business process protections of the participants regarding the submissions of requests may minimize such occurrences.

By specifying the ordering, and/or formatting, of the fields which are input into the hashing function, in addition to specifying the fields themselves to be used, alleviates the need to store the original message. Instead just the necessary components of the message required to compute the hash value need be stored. It will be appreciated that the selected fields may contain required and optional fields from the message. However, optional fields may be required to have a defined null value, which could include an empty string depending on the input format to the hashing function. The request message be a FIX string based message or a FIX binary message.

The formatting of the data values taken from the selected fields may be formatted for input into the hash function in various ways. For example, the data may be formatted as FIX tag value pairs as a string, as just the values as strings concatenated to each other without the FIX tags, or as the values converted to a binary format such as simple binary encoding ("SBE"), FIX Binary, or any other binary encoding format.

In one embodiment, an additional field may be added to all fix inbound messages which would act a salt value, or customer defined randomness. In cryptography, a salt is random data that is used as an additional input to a one-way function that hashes a password or passphrase, however, typically, this salt is also often provided by the system or is communicated separately from the message itself. In one implementation, salts may be set for a participant for a market segment and time duration by the participant or the exchange instead of per message by the participant. It will be appreciated that a salt, or any arbitrary customer defined, non-exchange verified field may leave room for hash manipulation and potential intentional collisions. However, in an electronic trading system implementation, an intentional collision may be considered market manipulation and prevented or discouraged, such as via regulatory or legal prohibitions. It will be appreciated that market manipulation via subversion of the token-based anonymity described above may be prevented by rendering such manipulation unfeasible due to the computational resources which must be employed to cause an intentional collision, i.e. by ensuring the token space is large enough. It will be further appreciated that the mechanisms, e.g. a large enough token space, to prevent accidental token collisions to prevent participant confusion as to request/response associations may further operate to discourage, and for all practical purposes, prevent market manipulation. As computing power increases and participants may be able to deploy increasing computational resources, the token space may be increased accordingly maintain the requisite level of statistical improbability of collisions. For request messages comprising mass quotes, a salt may be provided for each instrument or instrument-side pair that the participant provides It will be appreciated that should the target token space, e.g. 64 or 128 bits, be smaller than the output of the chosen hashing function, e.g. typically 265 bits or larger, it may be reasonable to compress, encrypt, mutate, or truncate the output of the well-defined hashing algorithm to fit inside of the field that holds the hash/token.

It will be appreciated that to ensure that participants are correctly computing their message hashes, the value may be returned as part of the request/order acknowledgment, such as was described above, even though by that time their request may have been processed, e.g. their order might have traded. However, such a mechanism may simply ensure that participants have the correct logic in place to calculate their message hashes.

In accordance with aspects of the disclosure, systems and methods are disclosed for generating financial messages in accordance therewith. The disclosed embodiments are preferably implemented with computer devices and computer networks, such as those described with respect FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
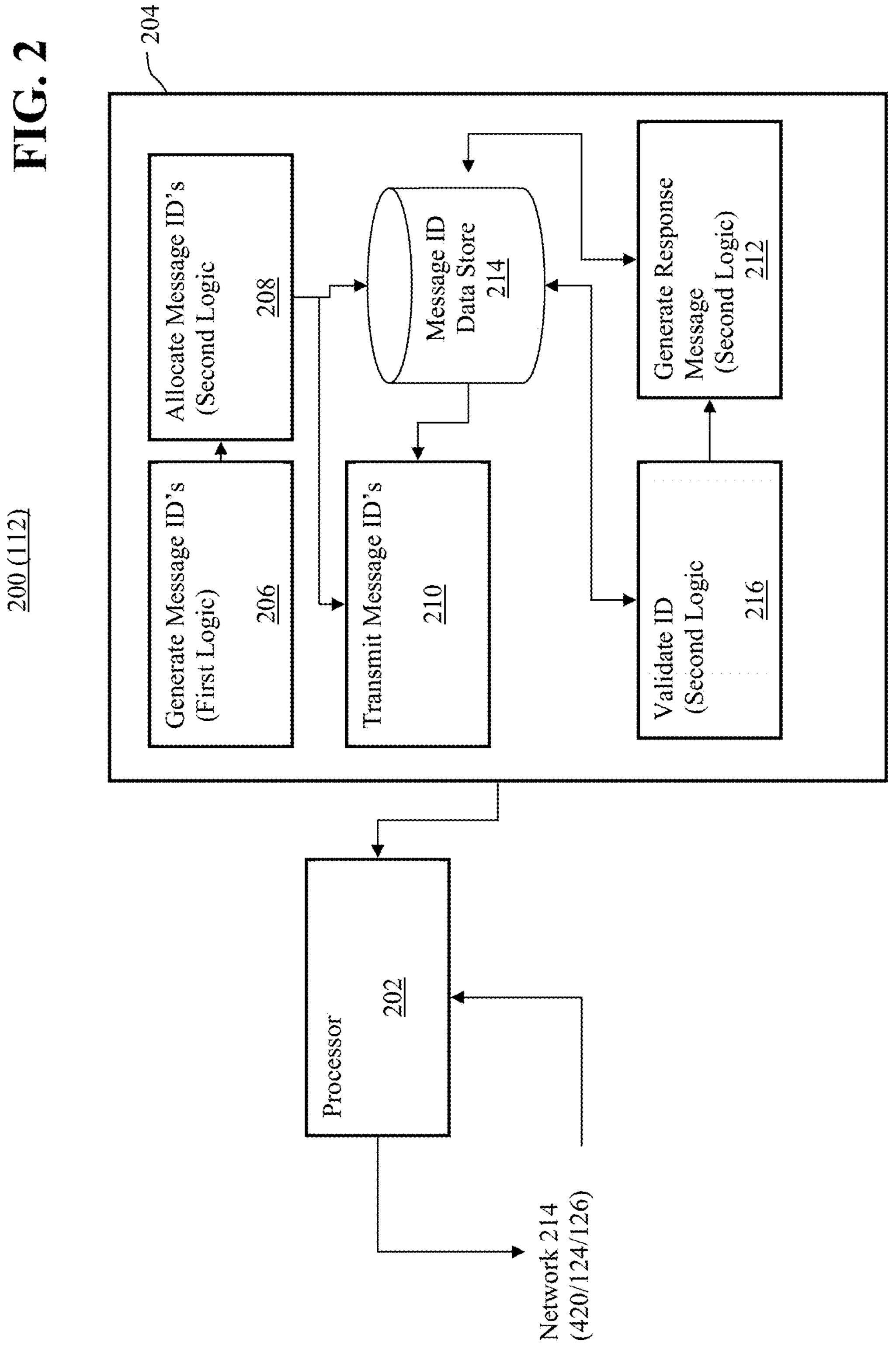
FIG. 2 depicts a block diagram of an exemplary implementation of the system of FIG. 1 for managing communications of financial messages.

As shown in FIG. 1, the Exchange computer system 100 includes a market data module 112 which may implement the disclosed mechanisms as will be describe with reference to FIG. 2. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 2 depicts a block diagram of a market data module 112 according to one embodiment, which in an exemplary implementation, is implemented as part of the exchange computer system 100 described above. As used herein, an exchange 100 includes a place or system that receives and/or executes orders. In particular, FIG. 2 shows a system 200 for efficient and secure management of reporting or otherwise communication, such as via a network 214, to a plurality of market participant of data indicative of a change in state of an electronic marketplace, e.g. an order book, for one or more financial products. The reporting/communications may be in the form of one or more financial messages communicated to the plurality of market participants via the network 214 which, as described above, may be the network 420 described below or network 124 or 126 described above, which may be implemented as a market data module 112 as described above. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed messages may be delivered by an open message standard implementation, such as FIX or FIX/FAST, or by an Exchange-provided API.

Generally, the plurality of response messages are communicated to a plurality of participants via a network, the plurality of response messages including a first response message responsive to a first request message previously received from a first participant of the plurality of participants, the first response message including data intended to be received by the plurality of participants, the first response message intended to be identified by at least the first participant as being associated therewith and responsive to the first request message, the other participants of the plurality of participants being unable to identify the first participant, the association of the first response message therewith, or an association of the first response message with another of the plurality of response messages as being responsive to request messages from a particular participant of the plurality of participants.

The system 200 for communication of a plurality of response messages to a plurality of participants via a network 214 includes a processor 202 and a memory 204 coupled therewith which may be implemented a processor 402 and memory 404 as described below with respect to FIG. 4. The system 200 further includes a message identifier generator 206, which may be implemented as a separate hardware component or as first logic 206 stored in the memory 204 and executable by the processor 202 to cause the processor 202 to generate a first message identifier, e.g. token, that has not been previously generated or is not currently in use, e.g. has not yet been included in a previously generated response message, responsive to full satisfaction/completion of a prior request, transmitted at a prior earlier time preceding the current time, immediately or by more than a threshold value, the first message identifier comprising a predictable component and a substantially random component, the message identifier not including any data indicative of the identity of any of the plurality of participants. The message identifier generator 206 may be coupled with a data storage 214, which may be stored in the memory 204 or in a separate memory, in which previously generated tokens are stored along with data indicative of the participant to whom the tokens are allocated and data indicative of whether a given token is in use, e.g. has not been included in a previously generated response message, responsive to full satisfaction/completion of a prior request, transmitted at a prior earlier time preceding the current time immediately or by more than a threshold value. Generation of identifiers may occur upon request of a participant or in advance thereof. The number of identifiers generated may be fixed or vary, and/or may be specified by the requestor. As one request may cause multiple responses to be generated, e.g. where the request may be partially satisfied over a period time, etc., each partial satisfaction event causing a response message, a token may remain in use until the request is full satisfied, modified or canceled, and a final response, indicative thereof, is sent.

The system 200 further includes a message identifier allocator 208 coupled with the message identifier generator 206, which may be implemented as second logic 208 stored in the memory 204 and executable by the processor 202 to cause the processor 202 to associate or otherwise allocate the first message identifier with the first participant and store the association in a memory, e.g. the data store 214, coupled with the message identifier allocator. Allocation of identifiers may occur upon request of a participant or in advance thereof. The number of identifiers allocated may be fixed or vary, and/or may be specified by the requestor.

The system 200 further includes a message identifier transmitter 210 coupled with the message identifier allocator 208, which may be implemented as third logic 210 stored in the memory 204 and executable by the processor 202 to cause the processor 202 to communicate or otherwise transmit the first message identifier to the first participant such that the first message identifier is known to the first participant and is associated with the first request message. As described above, at least allocation of message identifier may occur on demand, i.e. responsive to a request from a market participant. Transmission of allocated identifiers to the participant may occur upon demand, e.g. "pulled" or otherwise responsive to a request therefore, or at a defined time period, e.g. "pushed", such as via secure communications medium.

The system 200 further includes a response message generator 212 which may be implemented as fourth logic 212 stored in the memory 204 and executable by the processor 202 to cause the processor 202 to receive the first request message, determine the first message identifier associated therewith, generate the first response message including the associated first message identifier and transmit the first response message to the plurality of participants, the first participant's knowledge of the first message identifier being operative to allow identification of the first message by the first participant as being associated therewith, wherein other participants of the plurality of participants lacking knowledge of the association of the first message identifier with the first participant thereby being unable to identify the first messages as being associated therewith. It will be appreciated that the response message generator 212 may be implemented as part of the transaction processing system, such as the match engine 106 and may determine, such as by communicating with a match engine 106, that one or more attempts to match one or more incoming orders received from one or more of the plurality of market participants, each of which may specify a side (buy or sell), quantity, price and instrument, for at least one transaction for the one or more financial products with at least one previously received but unsatisfied order for a transaction counter thereto resulted, i.e. traded, in at least partial satisfaction, i.e., fill or partial fill, of one or both of the incoming order or the at least one other previously received order. The response message generator 212 may further generate, based on the determination that one or both of the incoming order(s) or the at least one other previously received order were at least partially satisfied, a reporting message, as described above, including data indicative of the participating or contributing trades, as a result of the at least partial satisfaction of one or both of the incoming order or the at least one previously received but unsatisfied order, as well as data enumerating each of the incoming order and at least one previously received but unsatisfied orders that were at least partially satisfied identified only by the generated identifiers described above. Wherein the response message generator 212 may be further operative to cause the processor 202 to cause the response message to be communicated to the plurality of market participants. In one embodiment, the reporting message may be communicated, i.e. to the plurality of market participants, via one or more transmissions, e.g. data packets.

As was described above, redundant data regarding each participating order may be non-redundantly provided in the response message which reduces the overall message size and, via the provisioning, may ensure that receiving market participants acquire this information sooner.

In one embodiment, the response message generator 212 may be further operative to determine a resultant state of the electronic marketplace due to the at least partial satisfaction of one or both of the incoming order or at least one previous received but unsatisfied order, wherein the response message further comprises data indicative of the determined resultant state. For example, the reporting message may be of the MBP format.

In one embodiment, the response message generator 212 may be further operative to determine a change in the state of the electronic marketplace due to the at least partial satisfaction of one or both of the incoming order or at least one previous received but unsatisfied order, wherein the response message further comprises data indicative of the determined change. For example, the reporting message may be of the MBO format.

In one embodiment, the system 200 further includes a message identifier validator 216 which may be implemented as fifth logic 216 stored in the memory 204 and executable by the processor 202 to cause the processor 202 to, prior to the generation of the first response message by the response message generator 212 and upon receipt of the first request message, determine the first message identifier associated therewith and determine if the first message identifier is further associated with the first participant. The message identifier validator 216 may be configured to receive the request prior to the response message generator, e.g. prior to the transaction processing system or match engine 106. In this way, a request, with an invalid identifier, may be rejected without consuming additional unnecessary resources, e.g. of the transaction processing system or match engine 106. In one embodiment, if the message identifier validator 216 determines that the first message identifier is not associated with the first participant, the first request message may be rejected, i.e. a rejection message is communicated back to the first participant and the request is not further processed by the system. Alternatively, or in addition thereto, if the message identifier validator 216 determines that the first message identifier is associated with the first participant, the message identifier validator is further operative to update the memory 214 to include data indicative of the first message identifier having been associated with a request message or otherwise being "in use". In one embodiment, wherein subsequent to an elapse of a threshold duration of time after generation of the first response message, the response message generator 212 is further operative to update the memory to include data indicative of the first message identifier not having been associated with a request message or otherwise that the first message identifier is no longer in use, e.g. that the first message identifier is available for re-use.

In one embodiment, the message identifier generator 206 is further operative to a generate a set, finite or otherwise, of message identifiers for the first participant, the set including the first message identifier, wherein each of the set of message identifiers has not been previously generated or is available for re-use, e.g. included in a subsequently canceled request or has been included in a previously generated response message, responsive to a fully satisfied/completed/canceled prior request, transmitted at a prior earlier time preceding the current time, immediately or by more than a threshold value, each of the set of message identifiers comprising a predictable component and a substantially random component and not including any data indicative of the identity of any of the plurality of participants.

In one embodiment, the first request message is one of a plurality of request messages received from the plurality of participants, each of the plurality of request messages being associated with one another, the predictable component of the first message identifier comprising data indicative of the association of the plurality of request messages. In one embodiment, the association is indicative of the destination to which all of the request messages are sent, e.g. an MSG or the electronic trading system, or the financial product (denoted by ISIN) to which all of the requests are related.

In one embodiment, the predictable component of the first message identifier comprises data indicative of a time when the first message identifier was generated.

In one embodiment, wherein the predictable component is operative to reduce uniqueness of the first message identifier and accelerate determination of whether the first message identifier has not been previously generated or is in use, e.g. has not yet been included in a previously generated response message, indicative of full satisfaction/completion/cancellation of a prior request, transmitted at a prior earlier time preceding the current time, immediately or by more than a threshold value. By reducing the number of previously generated tokens to which a newly generated token must be validated against, the validation process is accelerated as was described above.

In one embodiment, wherein the first request message is one of a plurality of request messages, the message identifier generator being located on the network where the order of receipt of the first request message as compared to the others of the plurality of request messages is determined, i.e. the point of determinism for the transaction processing system or match engine 106.

In one embodiment, wherein the first request message comprises a request to modify a previously received request message associated with a second message identifier, the first request message being received prior to generation of a response message responsive to the previously received request message, the first response message being generated responsive to both the first request message and the previous request message and including the first message identifier. As described above, the identifier associated with the first request may be recycled or otherwise enabled for reuse in a new request.

In one embodiment, wherein the first request is received according to a communications protocol, such as the TCP protocol, whereby a request receiver (not shown), upon receipt of the first request, is operative to communicate a first acknowledgment, e.g. a shallow acknowledgment, to the first participant via the network 214 and receive a second acknowledgment from the first participant responsive to their receipt of the first acknowledgment, wherein the message identifier transmitter 210 is further operative to communicate the first message identifier with the first acknowledgment and associate the first message identifier with the received first request message upon receipt of the second acknowledgment.

Figure 3:
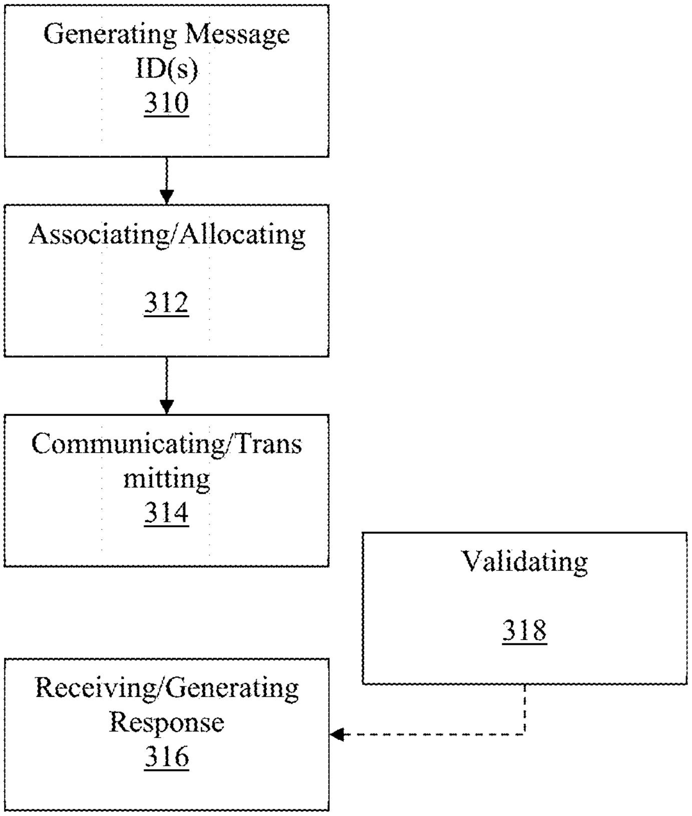
FIG. 3 depicts a flow chart showing operation of the system of FIGS. 1 and 2.

FIG. 3 depicts a flow chart showing operation of the system 200 of FIG. 2. In particular, FIG. 3 shows a computer implemented method for managing communication of a plurality of response messages to a plurality of participants via a network, the plurality of response messages including a first response message responsive to a first request message previously received from a first participant of the plurality of participants, the first response message including data intended to be received by the plurality of participants, the first response message intended to be identified by at least the first participant as being associated therewith and responsive to the first request message, the other participants of the plurality of participants being unable to identify the first participant, the association of the first response message therewith, or an association of the first response message with another of the plurality of response messages as being responsive to request messages from a particular participant of the plurality of participants.

Generally, the plurality of response messages are communicated to a plurality of participants via a network, the plurality of response messages including a first response message responsive to a first request message previously received from a first participant of the plurality of participants, the first response message including data intended to be received by the plurality of participants, the first response message intended to be identified by at least the first participant as being associated therewith and responsive to the first request message, the other participants of the plurality of participants being unable to identify the first participant, the association of the first response message therewith, or an association of the first response message with another of the plurality of response messages as being responsive to request messages from a particular participant of the plurality of participants.

The operation of the system 200 includes generating, by a processor 202, a first message identifier that has not been previously generated or is not in use/available for re-use, e.g. included in a subsequently canceled request or has been included in a previously generated response message, responsive to a fully satisfied/completed/canceled prior request, transmitted at a prior earlier time preceding the current time, immediately or by more than a threshold value, the first message identifier comprising a predictable component and a substantially random component, the message identifier not including any data indicative of the identity of any of the plurality of participants (Block 310). Generation of identifiers may occur upon request of a participant or in advance thereof. The number of identifiers generated may be fixed or vary, and/or may be specified by the requestor.

The operation of the system 200 further includes associating or otherwise allocating, by the processor 202, the first message identifier with the first participant and store the association in a memory coupled with the processor (Block 312). Allocation of identifiers may occur upon request of a participant or in advance thereof. The number of identifiers allocated may be fixed or vary, and/or may be specified by the requestor.

The operation of the system 200 further includes communicating or otherwise transmitting, by the processor, the first message identifier to the first participant such that the first message identifier is known to the first participant and is associated with the first request message (Block 314). As described above, at least allocation of message identifier may occur on demand, i.e. responsive to a request from a market participant. Transmission of allocated identifiers to the participant may occur upon demand, e.g. "pulled" or otherwise responsive to a request therefore, or at a defined time period, e.g. "pushed", such as via secure communications medium.

The operation of the system 200 further includes receiving, by the processor 202, the first request message, determining the first message identifier associated therewith, generating the first response message including the associated first message identifier and transmitting the first response message to the plurality of participants, the first participant's knowledge of the first message identifier being operative to allow identification of the first message by the first participant as being associated therewith, wherein other participants of the plurality of participants lacking knowledge of the association of the first message identifier with the first participant thereby being unable to identify the first messages as being associated therewith (Block 316). It will be appreciated that generation of response messages may be implemented as part of the transaction processing system, such as the match engine 106 and may determine, such as by communicating with a match engine 106, that one or more attempts to match one or more incoming orders received from one or more of the plurality of market participants, each of which may specify a side (buy or sell), quantity, price and instrument, for at least one transaction for the one or more financial products with at least one previously received but unsatisfied order for a transaction counter thereto resulted, i.e. traded, in at least partial satisfaction, i.e., fill or partial fill, of one or both of the incoming order or the at least one other previously received order. The response message generator 212 may further generate, based on the determination that one or both of the incoming order(s) or the at least one other previously received order were at least partially satisfied, a reporting message, as described above, including data indicative of the participating or contributing trades, as a result of the at least partial satisfaction of one or both of the incoming order or the at least one previously received but unsatisfied order, as well as data enumerating each of the incoming order and at least one previously received but unsatisfied orders that were at least partially satisfied identified only by the generated identifiers described above. Wherein the response message generator 212 may be further operative to cause the processor 202 to cause the response message to be communicated to the plurality of market participants. In one embodiment, the reporting message may be communicated, i.e. to the plurality of market participants, via one or more transmissions, e.g. data packets.

In one embodiment, the operation of the system 200 further includes, prior to the generation of the first response message, upon receipt of the first request message, determining, by the processor 202, the first message identifier associated therewith and determining if the first message identifier is further associated with the first participant. In one embodiment, if it is determined that the first message identifier is not associated with the first participants, rejecting, by the processor 202, the first request message (Block 318). Alternatively, or in addition thereto, if it is determined that the first message identifier is associated with the first participant, updating, by the processor, the memory to include data indicative of the first message identifier having been associated with a request message. Alternatively, or in addition thereto, wherein subsequent to an elapse of a threshold duration of time after generation of the first response message, updating, by the processor 202, the memory 214 to include data indicative of the first message identifier not having been associated with a request message, e.g. that first message identifier is available for re-use.

In one embodiment, the operation of the system 200 further includes generating a set, e.g. finite or otherwise, of message identifiers for the first participant, the set including the first message identifier, wherein each of the set of message identifiers has not been previously generated or is not in use, e.g. has been included in a previously generated response message, indicative of full/complete satisfaction/completion/cancellation of a prior request, transmitted at a prior earlier time preceding the current time, immediately or by more than a threshold value, each of the set of message identifiers comprising a predictable component and a substantially random component and not including any data indicative of the identity of any of the plurality of participants.

In one embodiment, the operation of the system 200 further includes, wherein the first request message is one of a plurality of request messages received from the plurality of participants, each of the plurality of request messages being associated with one another, the predictable component of the first message identifier comprising data indicative of the association of the plurality of request messages.

In one embodiment, the predictable component of the first message identifier comprises data indicative of a time when the first message identifier was generated. Alternatively, or in addition thereto, the predictable component may include an identifier of the processor or system which generated the first message identifier, e.g. the MSG.

In one embodiment, the predictable component is operative to reduce uniqueness of the first message identifier and accelerate determination of whether the has not been previously generated or is not in use, e.g. has been included in a previously generated response message, indicative of full/complete satisfaction/cancellation of a prior request, transmitted at a prior earlier time preceding the current time, immediately or by more than a threshold value.

In one embodiment, wherein the first request message is one of a plurality of request messages, the generating may occur on the network at a logical location where the order of receipt of the first request message as compared to the others of the plurality of request messages is determined.

In one embodiment, wherein the first request message comprises a request to modify a previously received request message associated with a second message identifier, the first request message being received prior to generation of a response message responsive to the previously received request message, the first response message being generated responsive to both the first request message and the previous request message and including the first message identifier.

In one embodiment, wherein the first request is received according to a communications protocol whereby, upon receipt of the first request, a first acknowledgment is communicated to the first participant via the network and a second acknowledgment is received from the first participant responsive to their receipt of the first acknowledgment, wherein the communicating further comprises communicating the first message identifier with the first acknowledgment and associating the first message identifier with the received first request message upon receipt of the second acknowledgment.

In one embodiment, a mechanism may be provided for instructing all participants, or a subset thereof, to delete, destroy, reset or otherwise throw out any tokens in their possession which have yet to be used. This function may be used to reset the system for new trading session, etc. or otherwise reset the token space for token reuse such as after a configurable period of time.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

As will be appreciated, the disclosed embodiments described above improve the technology of data communications and, in particular, the public communications, e.g. broadcast, of a message to a plurality of participants comprising data or information relevant to at least one of the plurality of participants wherein only those participants to whom the data is relevant may discern such relevance and wherein any inter-message relevance with respect to any one participant is further concealed from the remaining participants. Thereby, the necessity for direct communications of messages, e.g. confirmation or acknowledgement messages, to only those affected participants may be eliminated as redundant and thereby reducing the amount of data consumed thereby over the communications medium. This then increases the amount of bandwidth available for other communications or allows for the use of a lesser bandwidth, and potentially lesser cost, communications medium. It will also be appreciated that a reduction in the number of messages that need be generated further reduces the processing resources necessary for generating such messages.

Figure 4:
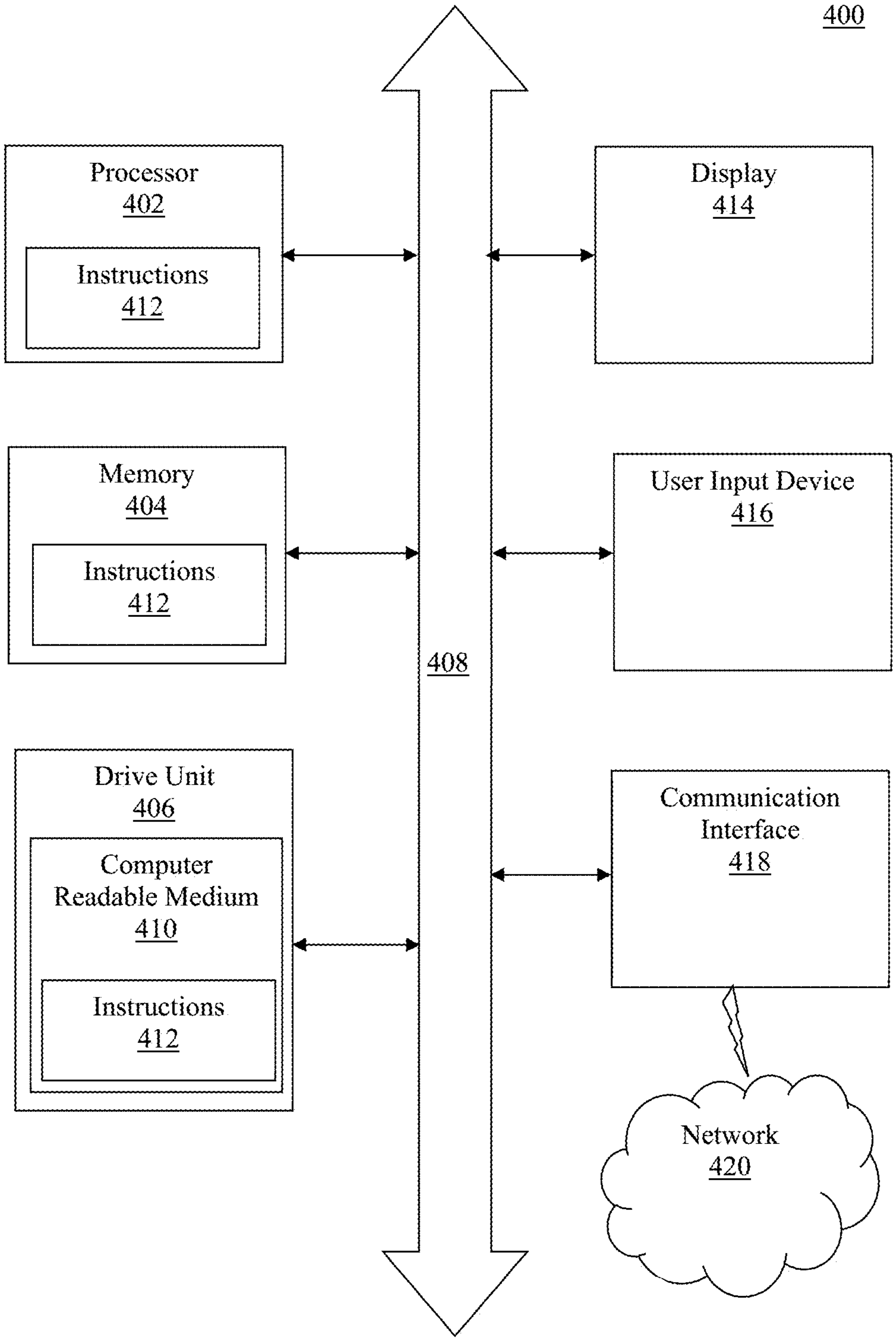
FIG. 4 shows an illustrative embodiment of a general computer system for use with the system of FIGS. 1 and 2.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, content addressable memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:

logic stored in a non-transitory memory and executable by a processor to cause the processor to:

generate a plurality of electronic message identifiers, each not already associated with a participant and comprising a predictable data component and a substantially random data component, the predictable data component configured to associate the generated electronic message identifier with a subset of other otherwise unassociated previously and subsequently generated electronic message identifiers, each generated electronic message identifier not including any data indicative of an identity of any of a plurality of participants;

communicate each generated electronic message identifier via an electronic communications network to a computer system of one of the plurality of participants and store an association therewith in the non-transitory memory;

receive, subsequent to the communication of the plurality of generated electronic message identifiers, an electronic request message including one of the plurality of generated electronic message identifiers via the electronic communications network;

the logic being further executable by the processor to cause, based on the electronic request message, the processor to:

determine the participant, of the plurality of participants, associated with the included generated electronic message identifier by searching only those of the plurality of generated electronic message identifiers stored in the non-transitory memory that are associated together by the predictable component of the included generated electronic message identifier;

generate, responsive to the electronic request message, an electronic response message and automatically include the included generated electronic message identifier therein, and, in lieu of transmission of a separate electronic response message responsive to the electronic request message only to the participant from which the electronic request message was received, transmit the electronic response message via the electronic communications network to the plurality of participants; and wherein, upon receipt of the electronic response message, the prior receipt of the generated electronic message identifier by the participant from which the electronic request message was received enables identification thereby of the electronic response message as being associated with the electronic request message and responsive thereto.

2. A system comprising a processor configured to:

generate a plurality of electronic message identifiers, each not already in use and comprising a predictable data component and a substantially random data component, the predictable data component configured to associate the generated electronic message identifier with a subset of other otherwise unassociated previously and subsequently generated electronic message identifiers, each generated electronic message identifier not including any data indicative of an identity of any of a plurality of participants;

communicate each generated electronic message identifier via an electronic communications network to a computer system of one of the plurality of participants and store an association therewith in a memory;

receive, subsequent to the communication of the plurality of generated electronic message identifiers, an electronic request message including one of the plurality of generated electronic message identifiers via the electronic communications network;

determine, based on the electronic request message, the participant, of the plurality of participants, associated with the included generated electronic message identifier by searching only those of the plurality of generated electronic message identifiers stored in the memory that are associated together by the predictable component of the included generated electronic message identifier;

generate, responsive to the electronic request message, an electronic response message and automatically include the included generated electronic message identifier therein, and, in lieu of transmission of a separate electronic response message responsive to the electronic request message only to the participant from which the electronic request message was received, transmit the electronic response message via the electronic communications network to the plurality of participants; and wherein, upon receipt of the electronic response message, the prior receipt of the generated electronic message identifier by the participant from which the electronic request message was received enables identification thereby of the electronic response message as being associated with the electronic request message and responsive thereto.

3. The system of claim 2, wherein the processor is further configured to communicate each generated electronic message identifier to a computer system of only one of the plurality of participants, wherein the computer system of any one participant may receive more than one generated electronic message identifier.

4. The system of claim 2, wherein the processor is further configured to reject the electronic request message if the included generated electronic message identifier is determined to be associated with a participant of the plurality of participants different from the participant from which the electronic request message was received.

5. The system of claim 2, wherein the generated electronic message identifier, upon generation, was determined not to be in use because it was either not previously generated or it is not associated with an electronic request message for which an electronic response message has not yet been generated.

6. The system of claim 2, wherein the processor is further configured to update the memory to include data indicative of the generated electronic message identifier being no longer in use.

7. The system of claim 2, wherein the predictable component reduces an amount of time to determine that, upon generation, the generated electronic message identifier is not in use.

8. The system of claim 2, wherein one of the plurality of generated electronic message identifier is one of a set of unique electronic message identifiers previously generated by the processor for the participant, the set including the generated electronic message identifier, wherein each of the set of unique electronic message identifiers having been determined, upon generation, to not be in use and comprises a predictable component and a substantially random component and not including any data indicative of the identity of any of the plurality of participants.

9. The system of claim 2, wherein the received electronic request message is one of a plurality of electronic request messages received from the plurality of participants, each of the plurality of electronic request messages being associated with one another, the predictable component of the generated message identifier comprising data indicative of the association of the plurality of electronic request messages.

10. The system of claim 2, wherein the predictable component of each of the plurality of generated electronic message identifiers comprises data indicative of a time when the generated electronic message identifier was generated.

11. The system of claim 2, wherein the predictable component is operative to reduce an amount of time for determination of the associated participant.

12. The system of claim 2, wherein the electronic request message is one of a plurality of electronic request messages, the processor being located on the electronic communications network where an order of receipt of the electronic request message as compared to the others of the plurality of electronic request messages is determined.

13. The system of claim 2, wherein the electronic request message comprises a request to modify a previously received electronic request message associated with another electronic message identifier, the electronic request message being received prior to generation of an electronic response message responsive to the previously received electronic request message, the electronic response message being generated responsive to both the electronic request message and the previous electronic request message and including both the other electronic message identifier and the included generated electronic message identifier.

14. The system of claim 2, wherein one of the plurality of generated electronic message identifier is communicated to a computer system of one of the plurality of participants in response to receipt of an electronic transaction message therefrom, the computer system of the one of the plurality of participants communicating an acknowledgment message in response thereto, wherein upon receipt of the acknowledgement message, the processor stores the association of the generated electronic message identifier with the one of the plurality of participants in the memory.

15. A computer implemented method comprising:

generating, by a processor, a plurality of electronic message identifiers, each not already in use and comprising a predictable data component and a substantially random data component, the predictable data component configured to associate the generated electronic message identifier with a subset of other otherwise unassociated previously and subsequently generated electronic message identifiers, each generated electronic message identifier not including any data indicative of an identity of any of a plurality of participants;

communicating, by the processor, each generated electronic message identifier via an electronic communications network to a computer system of one of the plurality of participants and storing an association therewith in a memory coupled with the processor;

receiving, by the processor subsequent to the communication of the plurality of generated electronic message identifiers, an electronic request message including one of the plurality of generated electronic message identifiers via the electronic communications network;

determining, by the processor based on the electronic request message, the participant, of the plurality of participants, associated with the included generated electronic message identifier by searching only those of the plurality of generated electronic message identifiers stored in the memory that are associated together by the predictable component of the included generated electronic message identifier;

generating, by the processor responsive to the electronic request message, an electronic response message and automatically include the included generated electronic message identifier therein, and, in lieu of transmission of a separate electronic response message responsive to the electronic request message only to the participant from which the electronic request message was received, transmit the electronic response message via the electronic communications network to the plurality of participants; and wherein, upon receipt of the electronic response message, the prior receipt of the generated electronic message identifier by the participant from which the electronic request message was received enables identification thereby of the electronic response message as being associated with the electronic request message and responsive thereto.

16. The computer implemented method of claim 15, further comprising communicating, by the processor, each generated electronic message identifier to a computer system of only one of the plurality of participants, wherein the computer system of any one participant may receive more than one generated electronic message identifier.

17. The computer implemented method of claim 15, further comprising rejecting, by the processor, the electronic request message if the included generated electronic message identifier is determined to be associated with a participant of the plurality of participants different from the participant from which the electronic request message was received.

18. The computer implemented method of claim 15, wherein the generated electronic message identifier, upon generation, was determined not to be in use because it was either not previously generated or it is not associated with an electronic request message for which an electronic response message has not yet been generated.

19. The computer implemented method of claim 15, further comprising updating, by the processor, the memory to include data indicative of the generated electronic message identifier being no longer in use.

20. The computer implemented method of claim 15, wherein the predictable component reduces an amount of time to determine that, upon generation, the generated electronic message identifier is not in use.

21. The computer implemented method of claim 15, wherein one of the plurality of generated electronic message identifier is one of a set of unique electronic message identifiers previously generated by the processor for the participant, the set including the generated electronic message identifier, wherein each of the set of unique electronic message identifiers having been determined, upon generation, to not be in use and comprises a predictable component and a substantially random component and not including any data indicative of the identity of any of the plurality of participants.

22. The computer implemented method of claim 15, wherein the received electronic request message is one of a plurality of electronic request messages received from the plurality of participants, each of the plurality of electronic request messages being associated with one another, the predictable component of the generated message identifier comprising data indicative of the association of the plurality of electronic request messages.

23. The computer implemented method of claim 15, wherein the predictable component of each of the plurality of generated electronic message identifier comprises data indicative of a time when the generated electronic message identifier was generated.

24. The computer implemented method of claim 15, wherein the predictable component is operative to reduce an amount of time for determination of the associated participant.

25. The computer implemented method of claim 15, wherein the electronic request message is one of a plurality of electronic request messages, the processor being located on the electronic communications network where an order of receipt of the electronic request message as compared to the others of the plurality of electronic request messages is determined.

26. The computer implemented method of claim 15, wherein the electronic request message comprises a request to modify a previously received electronic request message associated with another electronic message identifier, the electronic request message being received prior to generation of an electronic response message responsive to the previously received electronic request message, the electronic response message being generated responsive to both the electronic request message and the previous electronic request message and including both the other electronic message identifier and the included generated electronic message identifier.

27. The computer implemented method of claim 15, further comprising communicating, by the processor, one of the plurality of generated electronic message identifiers to a computer system of one of the plurality of participants in response to receipt of an electronic transaction message therefrom, the computer system of the one of the plurality of participants communicating an acknowledgment message in response thereto, wherein upon receipt, by the processor, of the acknowledgement message, storing the association of the generated electronic message identifier with the one of the plurality of participants in the memory.

* * * * *